United States Patent
Ohno et al.

(10) Patent No.: US 8,518,333 B2
(45) Date of Patent: Aug. 27, 2013

(54) HONEYCOMB STRUCTURED BODY AND EXHAUST GAS PURIFYING DEVICE

(75) Inventors: Kazushige Ohno, Ibigawacho (JP); Tomokazu Oya, Ibigawacho (JP)

(73) Assignee: Ibiden Co., Ltd., Ogaki-shi (JP)

( * ) Notice: Subject to any disclaimer, the term of this patent is extended or adjusted under 35 U.S.C. 154(b) by 712 days.

(21) Appl. No.: 11/476,929

(22) Filed: Jun. 28, 2006

(65) Prior Publication Data

US 2007/0020155 A1    Jan. 25, 2007

(30) Foreign Application Priority Data

Jul. 21, 2005  (JP) .................................. 2005-211706
Feb. 21, 2006  (WO) .................. PCT/JP2006/303072

(51) Int. Cl.
*B01D 50/00*    (2006.01)

(52) U.S. Cl.
USPC .......................................... 422/180; 422/177

(58) Field of Classification Search
USPC ............................ 422/171, 177, 180; 55/523
See application file for complete search history.

(56) References Cited

U.S. PATENT DOCUMENTS

| | | | | |
|---|---|---|---|---|
| 4,417,908 A | * | 11/1983 | Pitcher, Jr. ......................... | 55/523 |
| 4,902,487 A | * | 2/1990 | Cooper et al. .............. | 423/215.5 |
| 6,294,141 B1 | * | 9/2001 | Twigg et al. ............... | 423/213.7 |
| 7,284,980 B2 | | 10/2007 | Saijo et al. | |
| 7,521,025 B2 | * | 4/2009 | Ohno et al. .................... | 422/168 |
| 2004/0033175 A1 | | 2/2004 | Ohno et al. | |
| 2006/0021310 A1 | | 2/2006 | Ohno et al. | |
| 2006/0029898 A1 | | 2/2006 | Saijo et al. | |
| 2006/0043652 A1 | | 3/2006 | Saijo et al. | |
| 2006/0051556 A1 | | 3/2006 | Ohno et al. | |
| 2006/0075731 A1 | | 4/2006 | Ohno et al. | |
| 2006/0108347 A1 | | 5/2006 | Koyama et al. | |
| 2006/0118546 A1 | | 6/2006 | Saijo | |
| 2006/0228521 A1 | | 10/2006 | Ohno et al. | |
| 2006/0245465 A1 | | 11/2006 | Saijo et al. | |
| 2006/0254231 A1 | | 11/2006 | Hayashi et al. | |
| 2007/0028575 A1 | | 2/2007 | Ohno et al. | |
| 2007/0065348 A1 | | 3/2007 | Ohno et al. | |
| 2007/0068128 A1 | | 3/2007 | Oshimi et al. | |
| 2007/0085233 A1 | | 4/2007 | Yamada | |
| 2007/0126160 A1 | | 6/2007 | Takahashi | |
| 2007/0128405 A1 | | 6/2007 | Sakaguchi et al. | |
| 2007/0130897 A1 | | 6/2007 | Sakaguchi et al. | |

(Continued)

FOREIGN PATENT DOCUMENTS

EP    1250952    10/2002
EP    1486243    12/2004

(Continued)

OTHER PUBLICATIONS

U.S. Appl. No. 08/894,793, filed Jun. 22, 1999, Naruse et al.

(Continued)

*Primary Examiner* — Tom Duong
(74) *Attorney, Agent, or Firm* — Ditthavong Mori & Steiner, P.C.

(57) ABSTRACT

A honeycomb structured body of the present invention comprises a plurality of cells placed in parallel with one another in a longitudinal direction with a cell wall therebetween, wherein an oxide catalyst is supported on at least one portion of the cell wall, and the honeycomb structured body has an apparent density of about 0.7 $g/cm^3$ or less.

40 Claims, 7 Drawing Sheets

(56) References Cited

U.S. PATENT DOCUMENTS

| | | |
|---|---|---|
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2008/0006971 A1 | 1/2008 | Kawai et al. |
| 2008/0067725 A1 | 3/2008 | Naruse et al. |
| 2008/0083202 A1 | 4/2008 | Kunieda et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237428 A1 | 10/2008 | Kobayashi et al. |
| 2008/0237942 A1 | 10/2008 | Takamatsu |
| 2008/0241015 A1 | 10/2008 | Kudo et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1491257 | 12/2004 |
| EP | 1520614 | 4/2005 |
| EP | 1541216 | 6/2005 |
| EP | 06290989 | 12/2006 |
| GB | 2 236 493 A | 4/1991 |
| JP | 03-118811 | 5/1991 |
| JP | 04-040235 | 2/1992 |
| JP | 4-40235 | 2/1992 |
| JP | 08-012460 | 1/1996 |
| JP | 9-221304 | 8/1997 |
| JP | 11-076825 | 3/1999 |
| JP | 2001-098925 | 4/2001 |
| JP | 2001098925 A * | 4/2001 |
| JP | 2002-292246 | 10/2002 |
| JP | 2003-275580 | 9/2003 |
| JP | 2003-334443 | 11/2003 |
| JP | 2006-110413 | 4/2006 |
| WO | WO 02/26351 | 4/2002 |
| WO | WO 2005/005018 | 1/2005 |
| WO | WO 2005/045210 | 5/2005 |
| WO | WO 2006/021748 | 3/2006 |

OTHER PUBLICATIONS

U.S. Appl. No. 09/856,751, filed Dec. 30, 2003, Ohno et al.
U.S. Appl. No. 09/926,795, filed Sep. 6, 2005, Ohno et al.
U.S. Appl. No. 10/362,975, filed Feb. 19, 2004, Ohno et al.
U.S. Appl. No. 10/477,741, filed Aug. 19, 2004, Taoka et al.
U.S. Appl. No. 10/502,044, filed Sep. 28, 2006, Taoka et al.
U.S. Appl. No. 10/502,045, filed May 26, 2005, Kudo et al.
U.S. Appl. No. 10/502,054, filed Apr. 14, 2005, Kudo et al.
U.S. Appl. No. 10/506,247, filed May 19, 2005, Kudo, A.
U.S. Appl. No. 10/506,438, filed Jul. 28, 2005, Taoka et al.
U.S. Appl. No. 10/507,375, filed Aug. 4, 2005, Ohno et al.
U.S. Appl. No. 10/508,415, filed Aug. 4, 2005, Shibata, T.
U.S. Appl. No. 10/509,578, filed Aug. 18, 2005, Yamada, K.
U.S. Appl. No. 10/509,688, filed Jul. 14, 2005, Yamada, K.
U.S. Appl. No. 10/510,344, filed Aug. 11, 2005, Ohno, K.
U.S. Appl. No. 10/515,179, filed Apr. 6, 2006, Yamada, K.
U.S. Appl. No. 10/527,531, filed Jul. 27, 2006, Ogyu et al.
U.S. Appl. No. 10/541,462, filed Mar. 9, 2006, Ohno et al.
U.S. Appl. No. 10/671,418, filed Sep. 26, 2006, Ohno et al.
U.S. Appl. No. 10/986,227, filed Aug. 18, 2005, Ono et al.
U.S. Appl. No. 11/033,151, filed Jul. 28, 2005, Ohno et al.
U.S. Appl. No. 11/075,672, filed Aug. 11, 2005, Ohno et al.
U.S. Appl. No. 11/075,863, filed Oct. 10, 2006, Ohno et al.
U.S. Appl. No. 11/092,902, filed Nov. 10, 2005, Takahashi, T.
U.S. Appl. No. 11/098,410, filed Oct. 20, 2005, Yoshida, Y.
U.S. Appl. No. 11/127,236, filed Dec. 8, 2005, Ninomiya, T.
U.S. Appl. No. 11/174,726, filed Jul. 13, 2006, Ohno et al.
U.S. Appl. No. 11/278,782, filed Oct. 19, 2006, Kunieda, M.
U.S. Appl. No. 11/289,611, filed Jun. 22, 2006, Ohno et al.
U.S. Appl. No. 11/320,688, filed Oct. 5, 2006, Koyama et al.
U.S. Appl. No. 11/335,695, filed Aug. 17, 2006, Ohno et al.
U.S. Appl. No. 11/340,591, filed Aug. 24, 2006, Ohno et al.
U.S. Appl. No. 11/341,507, filed Aug. 31, 2006, Ohno et al.
U.S. Appl. No. 11/342,636, filed Aug. 3, 2006, Kunieda, M.
U.S. Appl. No. 11/376,571, filed Sep. 21, 2006, Ohno et al.
U.S. Appl. No. 11/389,333, filed Sep. 28, 2006, Yoshida, Y.
U.S. Appl. No. 11/390,275, filed Sep. 28, 2006, Yoshida, Y.
U.S. Appl. No. 11/398,602, filed Oct. 12, 2005, Yoshida, Y.
Supervised by Meisetsu Kajiwara, 4 Development of Continuous Regeneration DPF (CRT), Cleaning Technologies of Diesel Car Exhaust Gas, Jun. 23, 2006, First Popular Edition, pp. 209-210 (w/ partial translation).
Development of Diesel Particulate Filter (DPF) using SiC—Honeycomb—(Part 2) Engine Test Results.

* cited by examiner

A-A line cross-sectional view

B-B line cross-sectional view

C-C line cross-sectional view

US 8,518,333 B2

HONEYCOMB STRUCTURED BODY AND EXHAUST GAS PURIFYING DEVICE

CROSS-REFERENCE TO RELATED APPLICATIONS

This application claims benefit of priority based on Japanese Patent Application No. 2005-211706 filed on Jul. 21, 2005 and PCT/JP2006/303072 filed on Feb. 21, 2006. The contents of these applications are incorporated herein by reference in their entirety.

BACKGROUND OF THE INVENTION

1. Field of the Invention

The present invention relates to a honeycomb structured body and an exhaust gas purifying device that collect and remove particulates and the like contained in exhaust gases discharged from an internal combustion engine such as a diesel engine.

2. Discussion of the Background

Recently, particulates, such as soot, contained in exhaust gases that are discharged from internal combustion engines, such as diesel engines, have raised serious problems as contaminants harmful to the environment and the human body.

For this reason, various applications in which honeycomb structured bodies, which are made from porous ceramics using silicon carbide, cordierite or the like as materials, are used as filters for capturing particulates in exhaust gases to purify the exhaust gases have been proposed.

Here, it is necessary to continuously or discontinuously burn and eliminate particulates captured in the honeycomb structured body so as to regenerate the honeycomb structured body (hereinafter, referred to simply as "regeneration"), and with respect to this process, for example, a fuel adding material system, a system using a noble metal catalyst and a system using an oxide catalyst, which are carried out in combination with a post-injection, are proposed.

Moreover, the particulates can be burned and eliminated by using heating means such as a heater.

For example, JP-A 2001-98925 has disclosed an exhaust gas filter in which an oxide catalyst is supported.

Furthermore, JP-A 2001-98925 also describes that a noble metal catalyst can be supported together with the oxide catalyst.

The contents of JP-A 2001-98925 are incorporated herein by reference in their entirety.

SUMMARY OF THE INVENTION

A honeycomb structured body of the present invention comprises a plurality of cells placed in parallel with one another in a longitudinal direction with a cell wall therebetween wherein an oxide catalyst is supported on at least one portion of the cell wall, and the honeycomb structured body has an apparent density of about 0.7 g/cm$^3$ or less.

In the honeycomb structured body, desirably, the oxide catalyst contains at least CeO$_2$. Moreover, desirably, the oxide catalyst includes at least one compound selected from the group consisting of CeO$_2$, ZrO$_2$, FeO$_2$, Fe$_2$O$_3$, CuO, CuO$_2$, Mn$_2$O$_3$, MnO and a composite oxide represented by a composition formula A$_n$ B$_{1-n}$CO$_3$ (wherein A is La, Nd, Sm, Eu, Gd or Y; B is alkali metal or alkali earth metal; and C is Mn, Co, Fe or Ni).

Furthermore, the honeycomb structured body desirably has a heat resistant temperature of about 1200° C. or more.

Here, the amount of supported oxide catalyst is desirably set to at least about 10 g/L and at most about 50 g/L with respect to the apparent volume of the honeycomb structured body.

Moreover, the honeycomb structured body desirably comprises a plurality of lamination members laminated in the longitudinal direction so that the cells are superposed on one another. In such structure, the apparent density of the honeycomb structured body is desirably set to at least about 0.05 g/cm$^3$ and at most about 0.5 g/cm$^3$, the distance between the adjacent cells of the honeycomb structured body is desirably set to at least about 0.2 mm and at most about 5.0 mm, the porosity of the honeycomb structured body is desirably set to at least about 70% and at most about 95%, and the aperture ratio of the honeycomb structured body is desirably set to at least about 30% and at most about 60%.

Moreover, it is desirable that the honeycomb structured body is mainly made from silicon carbide and comprises a porous ceramic member in which a plurality of cells are placed in parallel with one another in the longitudinal direction with a cell wall therebetween. In such structure, the apparent density of the honeycomb structured body is desirably set to at least about 0.4 g/cm$^3$ and at most about 0.7 g/cm$^3$, the distance between the adjacent cells of the honeycomb structured body is desirably set to at least about 0.15 mm and at most about 0.5 mm, the porosity of the honeycomb structured body is desirably set to at least about 40% and at most about 60%, and the aperture ratio of the honeycomb structured body is desirably set to at least about 50% and at most about 80%.

An exhaust gas purifying device in accordance with the present invention comprises: a honeycomb structured body comprising a plurality of cells placed in parallel with one another in a longitudinal direction with a cell wall therebetween, wherein an oxide catalyst is supported on at least one portion of the cell wall, and the honeycomb structured body has an apparent density of about 0.7 g/cm$^3$ or less installed in an exhaust gas flow path; and a catalyst supporting carrier supporting a noble metal catalyst and being placed on the upstream side of the honeycomb structured body.

In the above-mentioned exhaust gas purifying device, the oxide catalyst desirably contains at least CeO$_2$. Further, the oxide catalyst desirably includes at least one compound selected from the group consisting of CeO$_2$, ZrO$_2$, FeO$_2$, Fe$_2$O$_3$, CuO, CuO$_2$, Mn$_2$O$_3$, MnO and a composite oxide represented by a composition formula A$_n$B$_{1-n}$CO$_3$ (wherein A is La, Nd, Sm, Eu, Gd or Y; B is alkali metal or alkali earth metal; and C is Mn, Co, Fe or Ni).

In the above-mentioned exhaust gas purifying device, a heat resistant temperature of the honeycomb structured body is desirably about 1200° C. or more.

In the above-mentioned exhaust gas purifying device, the amount of supported oxide catalyst of the honeycomb structured body is desirably set to at least about 10 g/L and at most about 50 g/L with respect to the apparent volume of the honeycomb structured body.

With respect to the honeycomb structured body installed in the exhaust gas purifying device, it is desirable that the honeycomb structured body comprises a plurality of lamination members laminated in the longitudinal direction so that the cells are superposed on one another. In such structure of the honeycomb structured body, the apparent density is desirably set to at least about 0.05 g/cm$^3$ and at most about 0.5 g/cm$^3$, the distance between the adjacent cells of the honeycomb structured body is desirably set to at least about 0.2 mm and at most about 5.0 mm, the porosity of the honeycomb structured body is desirably set to at least about 70% and at most about 95%, and the aperture ratio of the honeycomb structured body is desirably set to at least about 30% and at most about 60%.

Further, with respect to another type of honeycomb structured body installed in the exhaust gas purifying device, it is desirable that the honeycomb structured body is mainly made from silicon carbide and comprises a porous ceramic member in which a plurality of cells are placed in parallel with one another in the longitudinal direction with a cell wall therebetween. In such structure of the honeycomb structured body, the apparent density of the honeycomb structured body is desirably set to at least about 0.4 g/cm$^3$ and at most about 0.7 g/cm$^3$, the distance between the adjacent cells of the honeycomb structured body is desirably set to at least about 0.15 mm and at most about 0.5 mm, the porosity of the honeycomb structured body is desirably set to at least about 40% and at most about 60%, and the aperture ratio of the honeycomb structured body is desirably set to at least about 50% and at most about 80%.

DESCRIPTION OF THE EMBODIMENTS

Figure 1A:
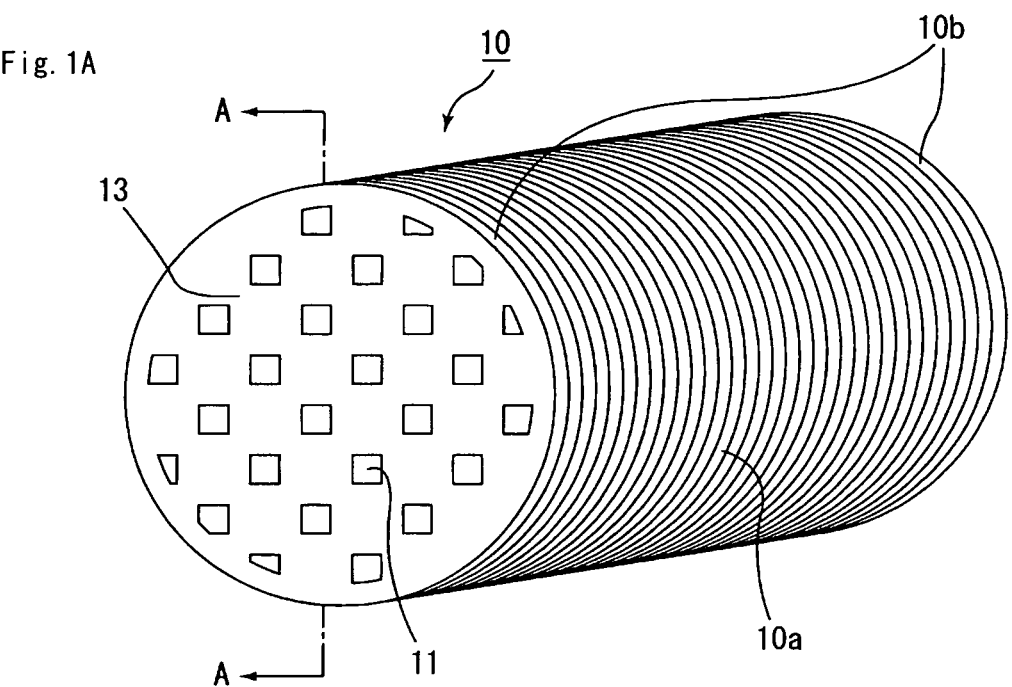
FIG. 1A is a perspective view that schematically shows one example of a honeycomb structured body of the present invention.

An embodiment of the honeycomb structured body according to the present invention comprises a plurality of cells placed in parallel with one another in a longitudinal direction with a cell wall therebetween, wherein an oxide catalyst is supported on at least one portion of the cell wall, and the honeycomb structured body has an apparent density of about 0.7 g/cm$^3$ or less.

In the above-mentioned embodiment of the honeycomb structured body according to the present invention, an oxide catalyst is supported on at least one portion of the cell wall.

With respect to the oxide catalyst, not particularly limited as long as it can reduce the burning temperature of particulates, examples thereof include: $CeO_2$, $ZrO_2$, $FeO_2$, $Fe_2O_3$, $CuO$, $CuO_2$, $Mn_2O_3$, $MnO$ and a composite oxide represented by a composition formula $A_nB_{1-n}CO_3$ (wherein A is La, Nd, Sm, Eu, Gd or Y; B is alkali metal or alkali earth metal; and C is Mn, Co, Fe or Ni).

Each of these materials may be used alone, or two or more kinds of these may be used in combination, and an oxide catalyst containing at least $CeO_2$ is desirably used.

By using such an oxide catalyst to be supported, it becomes possible to lower the burning temperature of particulates easily.

The amount of the supported oxide catalyst is set to at least about 10 g/L and at most about 50 g/L with respect to the apparent volume of the honeycomb structured body.

The amount of supported catalyst of about 10 g/L or more prevents increase in portions at which no oxide catalyst is supported on the wall faces of the honeycomb catalyst. Thus, portions at which particulates and the oxide catalyst are not made in contact with each other can be prevented from being generated, and thereby the burning temperature of particulates tends to be easily lowered to a sufficient value. On the other hand, the amount of supported catalyst set to about 50 g/L or less tends to sufficiently bring the particulates into contact with the catalyst, and the amount thereof exceeding about 50 g/L does not improve the contact between the particulates and the catalyst so much.

Moreover, the honeycomb structured body with the above-mentioned embodiment is allowed to have an apparent density of about 0.7 g/cm$^3$ or less.

The apparent density exceeding about 0.7 g/cm$^3$ makes the thermal capacity of the honeycomb structured body become too large to make it difficult for the honeycomb structured body to reach a catalyst active temperature, thus causing a reduction in the regenerating rate of the honeycomb structured body. In contrast, the apparent density of about 0.7 g/cm$^3$ or less makes it possible to sufficiently carry out a regenerating process on the honeycomb structured body.

The lower limit value of the apparent density is desirably set to about 0.05 g/cm$^3$.

The apparent density of about 0.05 g/cm$^3$ or more tends to provide sufficient strength for the honeycomb structured body to prevent breakage thereof.

Here, in the present specification, the apparent density refers to a value obtained by dividing the mass (g) of a sample by the apparent capacity (cm$^3$) of the sample, and the apparent capacity refers to a capacity of the sample including closed pores and opened pores (a capacity of the sample including a pore capacity of closed pores and a pore capacity of fully-opened pores which includes the opened pores on the surface of the sample).

Moreover, the honeycomb structured body with the above-mentioned embodiment desirably has a heat resistant temperature of about 1200° C. or more.

The heat resistant temperature of about 1200° C. or more prevents breakage such as erosion to the honeycomb structured body upon conducting a regenerating process, in particular, upon conducting a regenerating process for burning a great amount of particulates (for example, about 5 g/L or more) at one time.

Therefore, in the case where the heat resistant temperature of the honeycomb structured body is low (when the heat resistant temperature is less than about 1200° C.), it is necessary to carry out the regenerating process frequently so as to avoid erosion in the honeycomb structured body, and such frequent regenerating processes lead to a low burning rate (fuel consumption rate).

In particular, the above-mentioned embodiment of the honeycomb structured body according to the present invention has an oxide catalyst supported thereon, with the result that the temperature of the honeycomb structured body tends to easily rise; therefore, the heat resistant temperature is desirably set to the above-mentioned range.

Here, in order to avoid a reduction in the burning rate (fuel consumption rate) in the internal combustion engine, the regenerating process of the honeycomb structured body is desirably carried out with particulates of at least about 5 g/l and at most about 10 g/L being deposited.

Since the above-mentioned embodiment of the honeycomb structured body according to the present invention has an oxide catalyst supported thereon, the catalyst and particulates are easily made in contact with each other to easily lower the burning temperature of the particulates, and since the thermal capacity (apparent density) of the honeycomb structured body is small, the temperature is easily raised upon carrying out a regenerating process so that it becomes easier to positively burn the particulates. As a result, the regenerating rate of the honeycomb structured body can be easily improved, and the energy required for burning can also be reduced easily.

Moreover, unlike the conventional honeycomb filter, since the above-mentioned embodiment of the honeycomb structured body according to the present invention does not require a noble metal catalyst, such as Pt that is an expensive, valuable resource, to be supported thereon, it becomes possible to greatly cut costs.

Here, the regenerating rate of the honeycomb structured body refers to an index that shows a degree at which the weight of the honeycomb structured body that has increased due to accumulated particulates becomes closer to the initial weight by the regenerating process; therefore, as the weight of the honeycomb structured body becomes closer to the initial weight of the honeycomb structured body by the regenerating process, the regenerating rate becomes higher.

The specific modes of the honeycomb structured body according to the above-mentioned embodiment are mainly divided into the following three modes.

The first mode is a mode in which a plurality of lamination members are laminated in the longitudinal direction so that the cells are superposed on one another (hereinafter, this mode of the honeycomb structured body is referred to also as a laminated honeycomb structured body); the second mode relates to a honeycomb structured body configured by porous ceramic members, each having a structure in which a plurality of cells are placed in parallel with one another in the longitudinal direction with a cell wall therebetween, and in this mode, a plurality of porous ceramic members are bound with one another through a sealing material layer (adhesive layer) (hereinafter, the honeycomb structured body of this mode is also referred to as an aggregated honeycomb structured body); and the third mode relates to a honeycomb structured body configured by a porous ceramic member having a structure in which a plurality of cells are placed in parallel with one another in the longitudinal direction with a cell wall therebetween, and in this mode, the honeycomb structured body is made of a porous ceramic member having an integral form as a whole (hereinafter, the honeycomb structured body of this mode is also referred to as an integral honeycomb structured body).

In the present specification, when the honeycomb structured body is not specifically referred to as any of the above-mentioned three modes, such honeycomb structured body may be any honeycomb structured body of the three modes.

Here, the apparent density of the above-mentioned embodiment of the honeycomb structured body according to the present invention refers to an apparent density in a state in which the lamination members are laminated in the case where the honeycomb structured body is prepared as a laminated honeycomb structured body; in the case where the aggregated honeycomb structured body is prepared, the apparent density thereof refers to an apparent density of only the porous ceramic members comprising the honeycomb structured body (and not taking into consideration the apparent density of the sealing material layer); and in the case where the integral honeycomb structured body is prepared, the apparent density thereof refers to an apparent density of the porous ceramic member that is sintered and formed into one body as a whole.

The above-mentioned embodiment of the honeycomb structured body according to the present invention has a plurality of cells placed in parallel with one another in a longitudinal direction with a cell wall interposed therebetween.

With respect to the shape of the honeycomb structured body, a cylindrical shape is shown later in the drawings; however, not limited to the cylindrical shape, for example, a cylindroid shape, a rectangular pillar shape or the like may be used, and another desired shape may also be used.

In particular, in the case where the honeycomb structured body is placed right under an engine, since the space is extremely limited, the shape of the filter may also be needed to be formed into a complex shape.

In the case where a honeycomb structured body having a complex shape is manufactured, the above-mentioned laminated honeycomb structured body is desirably used. The honeycomb structured body of this type is suitably processed into a desired structure and shape.

Moreover, in the laminated honeycomb structured body according to the above-mentioned embodiment, the distance between adjacent cells (thickness of the cell wall) is desirably set to about 0.2 mm or more. The distance of about 0.2 mm or more can prevent a reduction in strength.

In the present specification, the cell wall refers to both of a cell wall that separates the adjacent cells and the peripheral portion thereof.

Moreover, the upper limit value of the distance (thickness of cell wall) between the adjacent cells is desirably set to about 5.0 mm.

The thickness of the cell wall of about 5.0 mm or less can prevent the aperture ratio and/or filtering area from becoming too small, to prevent an increase in the pressure loss. This arrangement also makes it easy to discharge ashes. Moreover, supposing that the range in which deep-layer-filtering of the particulates is carried out is referred to as an effective region of the wall for soot capturing, the ratio at which the effective region occupies in the cell wall can be prevented from decreasing.

With respect to the distance (thickness of the cell wall) between the adjacent cells, in the aggregated honeycomb structured body according to the above-mentioned embodiment and integral honeycomb structured body according to the above-mentioned embodiment, the lower limit value is desirably set to about 0.15 mm, and the upper limit value is desirably set to about 0.5 mm.

The distance of about 0.15 mm or more can prevent a reduction in strength, and the distance of about 0.5 mm or less can prevent an increase in the pressure loss.

Moreover, with respect to the average pore diameter of the laminated honeycomb structured body according to the above-mentioned embodiment, although not particularly limited, the lower limit value is desirably set to about 1 μm, and the upper limit value is desirably set to about 100 μm. The average pore diameter of about 1 μm or more makes it easier to allow particulates to be deep-layer-filtered inside the cell wall, to readily be brought into contact with the catalyst supported on the inside of the cell wall. On the other hand, the average pore diameter of about 100 μm or less prevents particulates from passing through the pores, so that the laminated honeycomb structured body is enabled to readily capture a sufficient amount of particulates and exert its function as a filter sufficiently.

The lower limit of the average pore diameter of the aggregated honeycomb structured body according to the above-mentioned embodiment and integral honeycomb structured body according to the above-mentioned embodiment is desirably set to about 5 μm, and the upper limit thereof is desirably set to about 50 μm.

The average pore diameter of about 5 μm or more can prevent an increase in pressure loss, while the average pore diameter of about 50 μm or less can prevent a reduction in capturing efficiency.

The lower limit of the porosity in the laminated honeycomb structured body according to the above-mentioned embodiment is desirably set to about 70%, and the upper limit thereof is desirably set to about 95%.

The porosity of about 70% or more makes the ashes generated upon burning particulates to readily pass through the cell walls, and prevents the ashes from accumulating on the surface of the cell walls and the inside thereof; thus, it becomes easier to avoid an increase in pressure loss due to the deposited ashes. In contrast, with the porosity of about 95% or less, the walls hardly need to be made thicker so as to increase the collecting efficiency of particulates; thereby the aperture ratio and/or the filtering area is/are prevented from becoming small so that an increase in pressure loss when exhaust gases flow in and out of the honeycomb structured body and/or pass through the inside of the honeycomb structured body hardly occurs. Moreover, it becomes easier to obtain a sufficient strength for the honeycomb structured body.

In the aggregated honeycomb structured body according to the above-mentioned embodiment and integral honeycomb structured body according to the above-mentioned embodiment, the lower limit of the porosity is desirably set to about 40%, and the upper limit thereof is desirably set to about 60%.

The porosity of about 40% or more tends to prevent an increase in pressure loss, and also prevent a high apparent density; thus, the apparent density can be easily set to about 0.7 $g/cm^3$ or less. On the other hand, the porosity of about 60% or less prevents a reduction in the strength of the honeycomb structured body.

Here, the above-mentioned porosity refers to the porosity after a catalyst has been supported.

The above-mentioned porosity and average pore diameter can be measured through known methods such as a mercury injection method using a mercury porosimeter, a weighing method, Archimedes method and a measuring method using a scanning electron microscope (SEM).

With respect to the cell density on the cross section perpendicular to the longitudinal direction of the laminated honeycomb structured body according to the above-mentioned embodiment, although not particularly limited, the lower limit thereof is desirably set to about 0.16 $pc/cm^2$ (about 1.0 $pc/in^2$) and the upper limit thereof is desirably set to about 93 $pcs/cm^2$ (about 600 pcs/in 2); more desirably, the lower limit value is set to about 0.62 $pc/cm^2$ (about 4.0 pcs/in 2), and the upper limit value is set to about 77.5 $pcs/cm^2$ (about 500 $pcs/in^2$).

Moreover, in the aggregated honeycomb structured body according to the above-mentioned embodiment and integral honeycomb structured body according to the above-mentioned embodiment, the above-mentioned cell density desirably provides the lower limit value of about 23.3 $pcs/cm^2$ (about 150 $pcs/in^2$) and the upper limit value of about 93 $pcs/cm^2$ (about 600 $pcs/in^2$).

Moreover, with respect to the size of the cell on the cross section perpendicular to the longitudinal direction of the honeycomb structured body according to the above-mentioned embodiment, although not particularly limited, the lower limit thereof is desirably set to about 0.8 mm×about 0.8 mm, and the upper limit thereof is desirably set to about 16 mm×about 16 mm.

The aperture ratio of the laminated honeycomb structured body according to the above-mentioned embodiment is desirably set to a lower limit value of about 30% and an upper limit value of about 60%.

The aperture ratio of about 30% or more can prevent an increase in pressure loss when exhaust gases flow in and out of the honeycomb structured body, and the aperture ratio of about 60% or less makes is possible to readily maintain a sufficient filtering area in an attempt to make the cell walls thicker, thereby preventing an increase in pressure loss and a reduction in the strength of the honeycomb structured body.

Here, in the aggregated honeycomb structured body according to the above-mentioned embodiment and integral honeycomb structured body according to the above-mentioned embodiment, the aperture ratio is desirably set to a lower limit value of about 50% and an upper limit value of about 80%. The aperture ratio of about 50% or more tends to prevent an increase in pressure loss, while the aperture ratio of about 80% or less tends to prevent a reduction in the strength.

Here, the aperture ratio of the honeycomb structured body refers to an aperture ratio on a cross section in the center of the honeycomb structured body, that is, an aperture ratio on a cross section obtained when the honeycomb structured body is cut perpendicularly to the longitudinal direction at the mid point in the longitudinal direction.

Next, referring to the drawings, the following description will discuss the embodiment of the laminated honeycomb structured body.

Figure 1B:
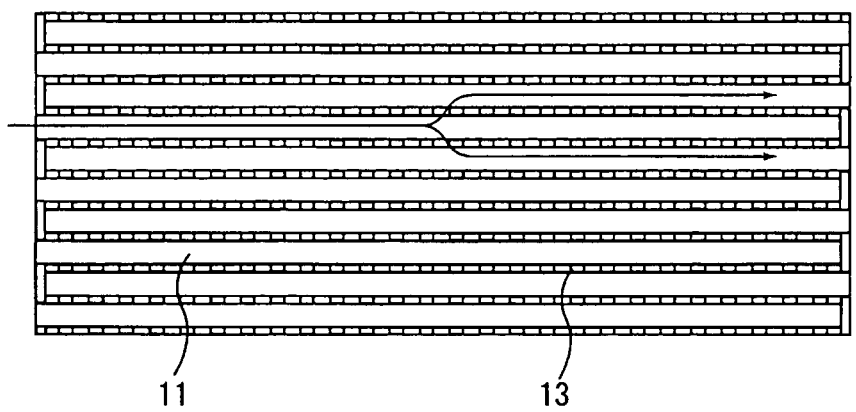
FIG. 1B is a cross-sectional view taken along line A-A thereof.

FIG. 1A is a perspective view that schematically shows one example of a laminated honeycomb structured body, and FIG. 1B is a cross-sectional view taken along line A-A of FIG. 1A.

A laminated honeycomb structured body 10 has a cylindrical shape in which a number of cells 11 with either one of ends being sealed are placed in parallel with one another in the longitudinal direction with a wall portion (cell wall) 13 therebetween.

In other words, as shown in FIG. 1B, the cell 11 has either one of ends corresponding to the inlet side or the outlet side of exhaust gases sealed so that exhaust gases that have flowed into one of the cells 11 are allowed to flow out of another cell 11 after passing through the cell wall 13 that separates the cells 11; thus, the cell wall 13 functions as a filter.

Here, the laminated honeycomb structured body 10 is prepared as a laminated body formed by laminating lamination members 10a and lamination members 10b for the end portions having a thickness of at least about 0.1 mm and at most about 20 mm, and the lamination members 10a are laminated so that the cells 11 are superposed on one another in the longitudinal direction.

Here, the expression, "the lamination members are laminated so that the cells are superposed on one another", refers to the fact that the lamination members are laminated so that the corresponding cells formed in adjacent lamination members are allowed to communicate with each other.

Moreover, on both ends of the laminated body, a plate member in which cells are formed with a diced pattern is laminated as the lamination member 10b for the end portion.

Here, an oxide catalyst is supported on the laminated honeycomb structured body, and the oxide catalyst may be supported on all the lamination members, or may be supported on only a part of the lamination members.

With respect to the apparent density of the laminated honeycomb structured body, the lower limit value is desirably set to about 0.05 g/cm$^3$, and the upper limit value is desirably set to about 0.5 g/cm$^3$.

The apparent density of about 0.05 g/cm$^3$ or more tends to enable the laminated honeycomb structured body to have a sufficient strength to prevent breakage thereof.

Moreover, the apparent density of about 0.5 g/cm$^3$ or less allows the honeycomb structured body to easily reach a catalyst active temperature so that this condition is more suitable for burning particulates continuously.

The respective lamination members may be bonded to each other by using an inorganic adhesive or the like, or may be simply laminated physically; and it is more desirable for the lamination members to be simply laminated physically. The simply laminated structure makes it possible to prevent the flow of exhaust gases from being blocked by a joining portion made from the adhesive or the like, and consequently to prevent the pressure loss from becoming high. Here, in the case of the structure in which the respective lamination members are simply laminated physically, a laminated body is formed by laminating the lamination members in a metal casing, which will be described later, and a pressure is applied thereto.

The laminated honeycomb structured body according to the above-mentioned embodiment has a structure in which the lamination members are laminated in the longitudinal direction; therefore, even when a great temperature difference is generated over the entire filter upon regeneration or the like, a temperature difference generated in each of the lamination members is small, and since the resulting thermal stress is also small, a damage hardly occurs. For this reason, the laminated honeycomb structured body is easily designed to have a high porosity in order to provide a deep-layer filtering function inside the cell walls. Moreover, as described above, since the laminated honeycomb structured body is allowed to easily achieve the deep-layer filtering process of particulates, the catalyst supported on the inside of the cell walls is easily made in contact with particulates so that the particulates are burned more easily.

Moreover, in particular, when the filter is formed into a complex shape, the filter becomes extremely fragile to a thermal stress; however, the laminated honeycomb structured body is less susceptible to damages even with the filter having a complex shape.

The lamination members forming the laminated honeycomb structured body are desirably prepared as lamination members mainly made from inorganic fibers (hereinafter, referred to as inorganic fiber lamination members) or lamination members mainly made of metal (hereinafter, referred to as metal lamination members). These members are superior in heat resistance, and provide a high strength in the honeycomb structured body that is designed to have a high porosity.

Upon laminating the respective lamination members, only the inorganic fiber lamination members may be laminated, or only the metal lamination members may be laminated.

Moreover, the inorganic fiber lamination members and the metal lamination members may be laminated in combination. Upon laminating these two types of members in combination, the order of laminating processes is not particularly limited.

With respect to the material for the above-mentioned metal lamination members, not particularly limited, for example, chromium-based stainless steel, chromium-nickel-based stainless steel and the like may be used.

Moreover, the above-mentioned metal lamination members are desirably prepared as a structural body in which metal fibers made of the above-mentioned metal are entangled three-dimensionally, as a structural body which is made of the above-mentioned metal and has penetrating pores formed therein by a pore-forming material, as a structural body in which metal powder, made of the above-mentioned metal, is sintered so that pores are allowed to remain, and the like.

With respect to the material for the inorganic fibers forming the inorganic fiber lamination member, examples thereof include: oxide ceramics such as silica-alumina, mullite, alumina, silica, titania and zirconia, nitride ceramics such as silicon nitride and boron nitride, carbide ceramics such as silicon carbide, and basalt. Each of these materials may be used alone, or two or more of these may be used in combination.

Desirably, the lower limit value of the fiber length of the inorganic fibers is set to about 0.1 mm, and the upper limit value thereof is set to about 100 mm; more desirably, the lower limit value thereof is set to about 0.5 mm, and the upper limit value thereof is set to about 50 mm. Desirably, the lower limit value of the fiber diameter of the inorganic fibers is set to about 0.3 µm, and the upper limit value thereof is set to about 30 µm; more desirably, the lower limit value thereof is set to about 0.5 µm, and the upper limit value thereof is set to about 15 µm.

In addition to the inorganic fibers, the above-mentioned inorganic fiber lamination member may contain a binder that joins these inorganic fibers to each other so as to maintain a predetermined shape.

With respect to the binder, not particularly limited, examples thereof include alumina sol, silica sol and titania sol.

The inorganic fiber lamination member may contain a slight amount of inorganic particles and metal particles.

Moreover, in the inorganic fiber lamination member, the inorganic fibers may be anchored with one another by an inorganic matter containing silica, or the like. In this structure, desirably, the vicinity of each intersecting portion between the inorganic fibers is firmly fixed to each other. With this structure, it becomes easier for the inorganic fiber lamination member to become superior in the strength and flexibility.

With respect to the above-mentioned inorganic matter containing silica, examples thereof include: inorganic glass, such as silicate glass, silicate alkali glass and borosilicate glass.

Moreover, a lamination member for the end portion in which cells are formed with a diced pattern is desirably laminated on either end of the laminated inorganic fiber lamination members and metal lamination members.

By laminating the lamination member for the end portion thereon, it is possible to seal either one of the end portions of each cell, without the necessity of having to seal the cell on the end portion with a plug.

The lamination member for the end portion may be prepared as a member made of the same material as the inorganic fiber lamination member and the metal lamination member, with cells formed in a diced pattern, or as a plate member with a dense structure in which cells are formed in a diced pattern.

In the present specification, the dense structure refers to a structure having a porosity smaller than the lamination member, and specific materials thereof include, for example, metals, ceramics and the like.

In the case where the above-mentioned plate member with a dense structure is used, it becomes possible to readily make the above-mentioned lamination member for the end portion thinner.

Moreover, with respect to the above-mentioned lamination member for the end portion, a member made of metal having a dense structure is desirably used.

Furthermore, as the material of the lamination member for the end portion laminated on the both ends of the laminated body, only one of the materials mentioned above may be used, or two or more of them may be used in combination.

With respect to the combinations between the lamination members and the lamination member for the end portion, the following combinations are used: (1) combination in which an inorganic fiber lamination member is used as the lamination member, and an inorganic fiber lamination member, a metal laminated member, or a plate member having a dense structure, each of which have cells formed with a diced pattern, is used as the lamination member for the end portion, and (2) combination in which a metal lamination member is used as the lamination member, and an inorganic fiber lamination member, a metal lamination member, or a plate member having a dense structure, each of which have cells formed with a diced pattern, is used as the lamination member for the end portion.

In the case where a metal lamination member is used as the lamination member, a metal lamination member or a plate member having a dense structure, each of which have cells formed with a diced pattern, is desirably used as the lamination member for the end portion.

In the case where the plate member having a dense structure is used as the lamination member for the end portion, it becomes easier to prevent soot from leaking from the plugged portion even when the plate member is made thinner.

Moreover, in the case where only metal lamination members are used as the lamination members and in the case where a metal lamination member or a metal plate member having a dense structure, each of which have cells formed with a diced pattern, is laminated on either end of the laminated inorganic fiber lamination members and metal lamination members, the result is hardly eroded even after use for a long period of time.

Moreover, it becomes easier to prevent a gap between the lamination members and the metal casing, as well as a gap between the respective lamination members, from generating at a high temperature (in use) due to a difference in thermal expansion between the lamination members and the metal casing, and as a consequence considered that it becomes easier to prevent particulates in exhaust gases from leaking which leads to a reduction in the capturing efficiency of particulates.

Moreover, in the laminated honeycomb structured body according to the above-mentioned embodiment, when lamination members having different cell dimensions are manufactured and those are laminated one after another, irregularities are formed on the inner surface of each cell so that the filtering area becomes greater and thus considered that it becomes possible to further reduce the pressure loss upon collecting particulates. Moreover, since the irregularities form the flow of exhaust gases into a turbulent flow, it is considered that the temperature difference in the filter can be made smaller so that it becomes easier to effectively prevent damages due to a thermal stress.

With respect to the shape of the cells on the plan view, not particularly limited to a quadrangular shape, any optional shape, such as a triangle, a hexagon, an octagon, a dodecagon, a round shape and an elliptical shape, may be used.

The laminated honeycomb structured body according to the above-mentioned embodiment is normally housed in a cylinder-shaped (can-type) metal casing.

With respect to the material for the metal casing, for example, stainless, iron and the like may be used.

With respect to the shape of the metal casing, an undividable cylinder-shaped (can-type) member may be used, or a cylinder-shaped (can-type) member (for example, a clamshell-type metal casing and the like) that can be divided into two or a plurality of division members may be used. When the above-mentioned metal casing is prepared as a dividable member, the honeycomb structured body can be easily housed.

Figure 2A:
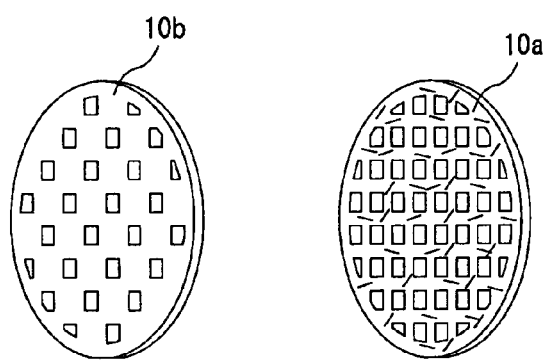
FIG. 2A is a perspective view that schematically shows lamination members that form a honeycomb structured body of the present invention.
Figure 2B:
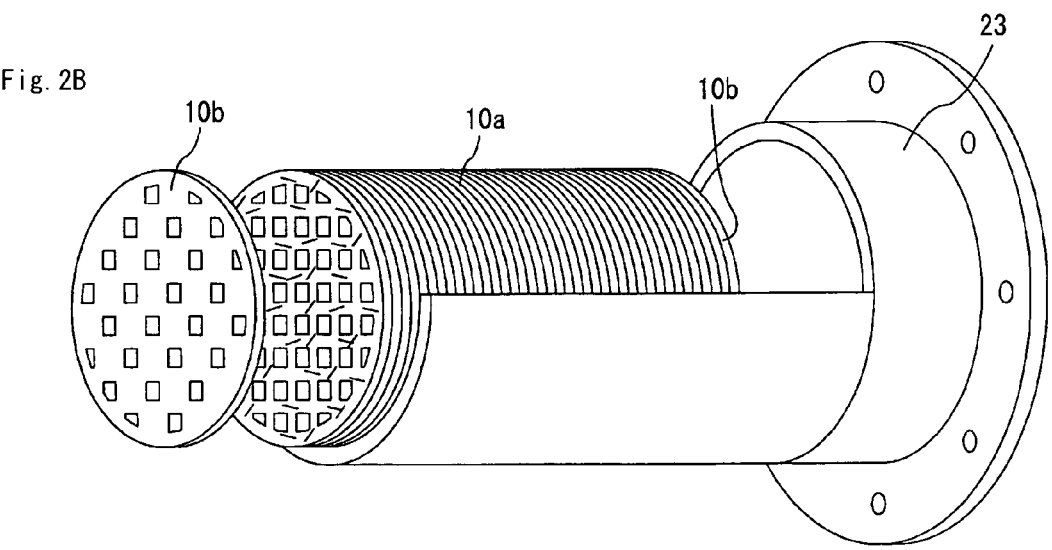
FIG. 2B is a perspective view that shows a state in which the lamination members shown in FIG. 2A are laminated to manufacture the honeycomb structured body.

Next, referring to FIGS. 2A and 2B, the following description will discuss an embodiment of a manufacturing method of the laminated honeycomb structured body.

(1) Manufacturing Method of the Metal Lamination Member

First, a porous metal plate, mainly made of metal having a thickness of at least about 0.1 mm to at most about 20 mm, is subjected to a laser machining process or a stamping process so that cells are formed over the almost entire face with almost equal intervals; thus, a lamination member 10a having cells formed with a high density as shown in FIG. 2A is manufactured.

Moreover, in the case of manufacturing a lamination member that is placed in the vicinity of the end face of the laminated honeycomb structured body and which forms the plugged portion of the cells, the cells thereof are formed into a diced pattern during the laser machining process so that a lamination member (lamination member for the end portion) 10b with a low density of cells is manufactured.

By using one or several lamination members with the low density of cells for the end portions, a laminated honeycomb structured body capable of functioning as a filter can be obtained without carrying out the process of plugging predetermined cells at the end portion.

Next, an oxide catalyst is supported on the metal lamination member.

With respect to the method for supporting the oxide catalyst, for example, a method in which the metal lamination member is immersed for about 5 minutes in a solution containing about 10 g of $CZ(nCeO_2\text{-}mZrO_2)$, about 1 L (liter) of ethanol, about 5 g of citric acid and a proper amount of pH adjusting agent, and is then subjected to a firing process at about 500° C. is proposed.

In this method, the amount of catalyst to be supported can be adjusted by repeating the above-mentioned immersing and firing processes.

Here, the above-mentioned catalyst may be supported only on a part of the metal lamination members or may be supported on all the metal lamination members.

(2) Manufacturing Method of the Inorganic Fiber Lamination Member

First, a sheet-forming slurry is prepared. More specifically, for example, inorganic fibers and an inorganic matter such as inorganic glass are sufficiently mixed, and an appropriate amount of water, an organic binder, an inorganic binder, etc. are added to this on demand, and this is sufficiently stirred to prepare the sheet-forming slurry.

Next, by using the sheet-forming slurry, a lamination member mainly composed of inorganic fibers is produced by a sheet-forming process.

More specifically, the sheet-forming slurry is formed into a sheet by using a mesh, and the resulting product is dried at a temperature of at least about 100° C. and at most about 200° C., and this is then subjected to a stamping process so that cells are formed over almost the entire face with equal intervals, and this is further subjected to a heating process at a temperature of at least about 900° C. and at most about 1050° C. so that a lamination member having a predetermined thickness with cells formed therein with a high density, as shown in FIG. 2A, is obtained.

Moreover, in the case of manufacturing a lamination member that is placed at the vicinity of the end faces of the laminated honeycomb structured body and which forms the plugged portion of the cells, the sheet-forming slurry is formed into a sheet by using a mesh, and the resulting product is dried at a temperature of at least about 100° C. and at most about 200° C., and this is then subjected to a stamping process so that cells are formed with a diced pattern, and this is further subjected to a heating process at a temperature of at least about 900° C. and at most about 1050° C. so that a lamination member (lamination member for the end portion) with predetermined cells formed therein with a low density is manufactured.

In these methods, an inorganic fiber lamination member with inorganic fibers being anchored with one another by an inorganic matter such as inorganic glass can be manufactured.

The lamination member thus manufactured may further be subjected to an acid treatment or a quenching process thereafter, if necessary.

Then, an oxide catalyst is supported on the inorganic fiber lamination member.

Upon supporting the catalyst, an oxide catalyst may be preliminarily supported on the inorganic fibers such as alumina fibers that form a constituent material. By supporting the catalyst on the inorganic fibers prior to forming, it becomes possible to adhere the catalyst in a more evenly dispersed state.

With respect to the method for supporting the oxide catalyst on the inorganic fibers, for example, a method in which, after having been immersed in a slurry containing the oxide catalyst, the inorganic fibers are pulled out and heated is proposed.

Here, the above-mentioned catalyst may be supported only on a part of the inorganic fiber lamination members, or may be supported on all inorganic fiber lamination members.

The catalyst may be supported after the sheet-forming process.

(3) Laminating Process of Lamination Members

As shown in FIG. 2B, a cylinder-shaped (can-type) metal casing 23 having a pressing metal member on its one side is used, and after one to several of the lamination members 10b for the end portion, manufactured in the processes (1) to (3), have been laminated in the metal casing 23, a predetermined number of inside lamination members 10a are laminated thereon. Lastly, one to several of the lamination members 10b for the end portion are laminated thereon, and this is subjected to a pressing process, and a pressing metal member is also placed and secured onto the other end so that a honeycomb structured body is manufactured. Of course, in these processes, the respective lamination members are laminated so that the cells are superposed on one another.

Here, in the case where a plate member made of metal with a dense structure is used as the lamination members for the end portion, this may be subjected to a welding process to be used as the pressing member.

Moreover, in the case where a laminated honeycomb structured body made of the inorganic fiber lamination members is used, since the porosity decreases as the lamination members become thinner upon being pressed, the lamination members need to be manufactured by taking this reduced portion into consideration.

Referring to the drawings, the following description will discuss an embodiment of the aggregated honeycomb structured body.

Figure 3:
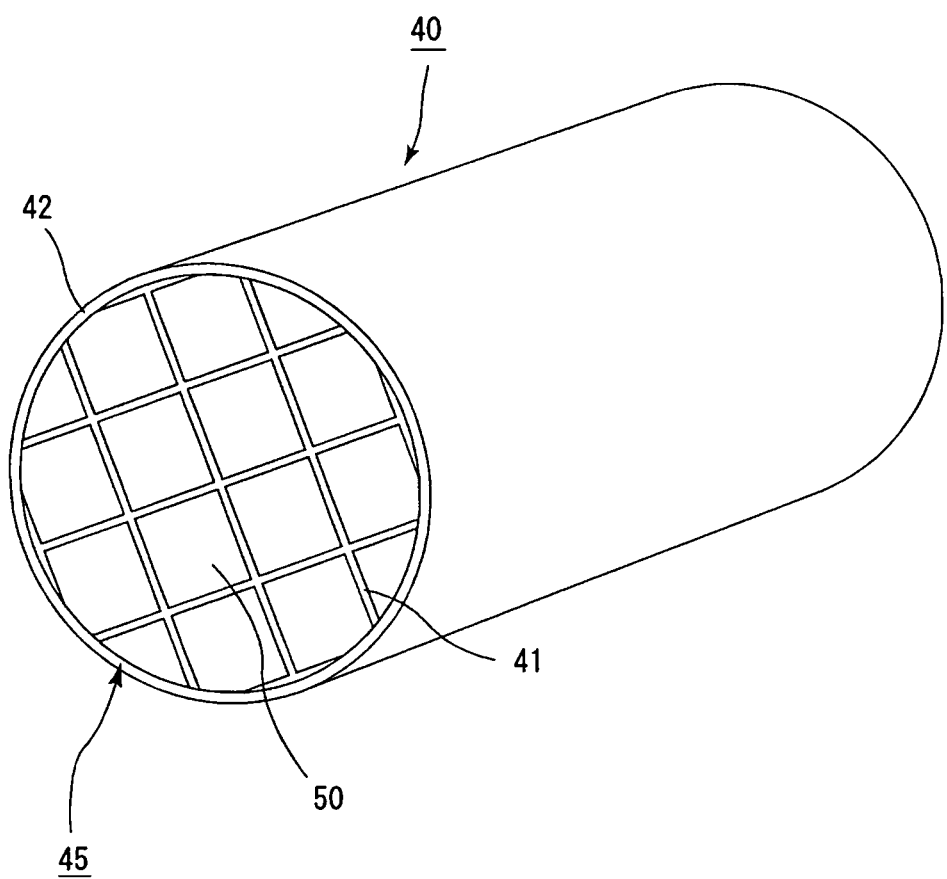
FIG. 3 is a perspective view that schematically shows one example of a honeycomb structured body of the present invention.
Figure 4A:
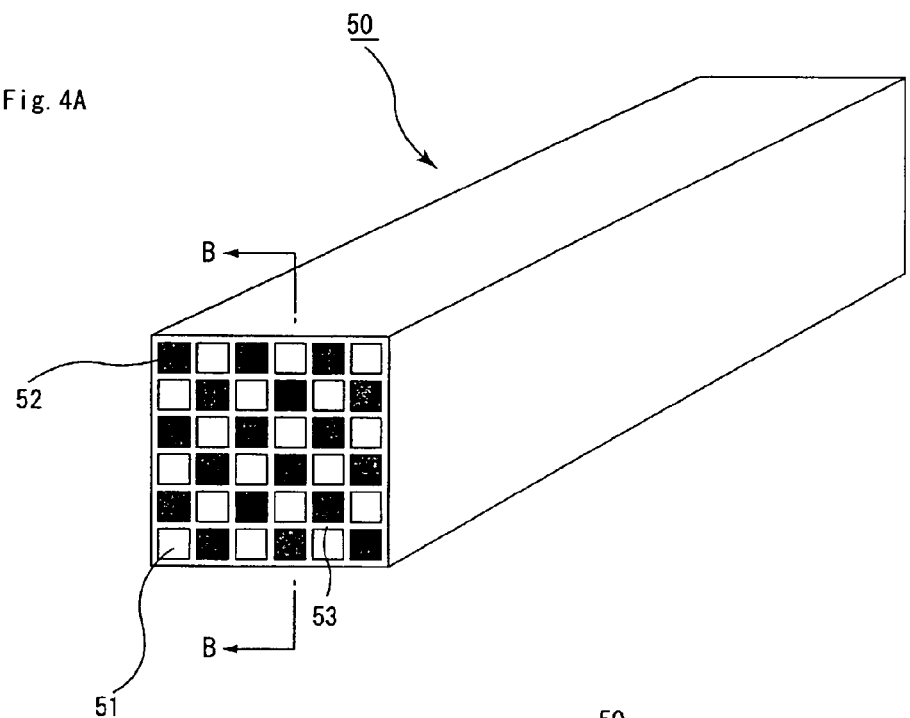
FIG. 4A is a perspective view that schematically shows porous ceramic members that form a honeycomb structured body of the present invention.
Figure 4B:
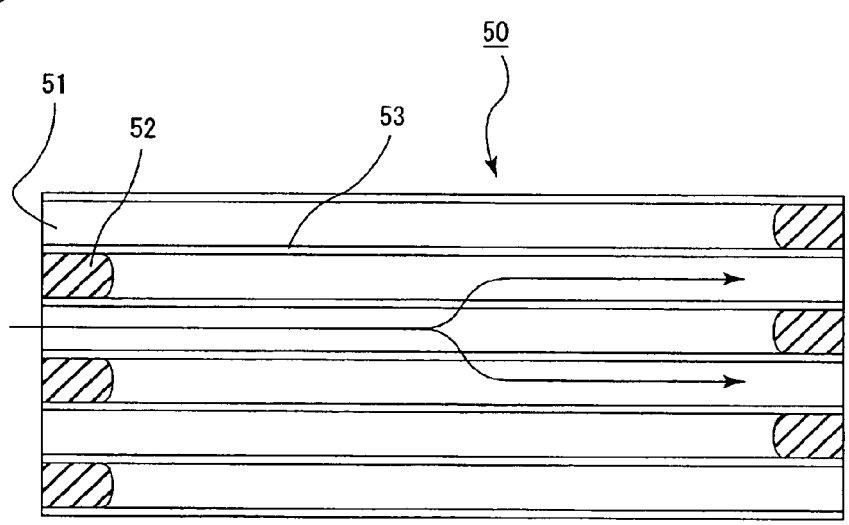
FIG. 4B is a cross-sectional view taken along line B-B thereof.

FIG. 3 is a perspective view that schematically shows one example of the aggregated honeycomb structured body, FIG. 4A is a perspective view showing porous ceramic members that comprise the honeycomb structured body shown in FIG. 3, and FIG. 4B is a cross-sectional view taken along line B-B of the porous ceramic member shown in FIG. 4A.

In the aggregated honeycomb structured body 40, a plurality of porous ceramic members 50 made from silicon carbide or the like are combined with each other through sealing material layers (adhesive layers) 41 to form a cylindrical ceramic block 45, and a sealing material layer (coat layer) 42 is formed on the periphery of this ceramic block 45.

As shown in FIGS. 4A and 4B, the porous ceramic member 50 has a number of cells 51 placed in parallel with one another in the longitudinal direction so that cell walls (wall portions) 53 that separate the cells 51 are allowed to function as filters. In other words, each of the cells 51 formed in the porous ceramic member 50 has either one of the ends on the inlet side or the outlet side of exhaust gases sealed with a plug 52 as shown in FIG. 4B so that exhaust gases that have flowed into one of the cells 51 are allowed to flow out of another cell 51 after surely having passed through a cell wall 53 that separates the cells 51.

Here, an oxide catalyst is supported on the porous ceramic member 50.

With respect to the apparent density of the aggregated honeycomb structured body according to the above-mentioned embodiment, the lower limit value is desirably set to about 0.4 g/cm$^3$, and the upper limit value is desirably set to about 0.7 g/cm$^3$.

The apparent density of about 0.4 g/cm$^3$ or more enables the aggregated honeycomb structured body to have a sufficient strength to prevent breakage, and the apparent density of about 0.7 g/cm$^3$ or less prevents the thermal capacity of the honeycomb structured body from becoming too high so that the temperature readily becomes high in the honeycomb structured body.

The aggregated honeycomb structured body 40 is mainly made of porous ceramics, and with respect to the material, examples thereof include: nitride ceramics such as aluminum nitride, silicon nitride and boron nitride; carbide ceramics such as silicon carbide and zirconium carbide; and oxide ceramics such as alumina, silica and aluminum titanate. Here, the aggregated honeycomb structured body 40 may be formed by using materials of two or more kinds, such as a composite body between silicon and silicon carbide. In the case where the composite body between silicon and silicon carbide is used, silicon is desirably added thereto so as to be set to at least about 5% by weight and at most about 45% by weight in the entire body.

With respect to the porous ceramic material, a silicon carbide ceramic material is desirably used. In particular, since this material is superior in heat resistance, this material hardly causes erosion at the time of a regenerating process, and this material is also superior in mechanical properties and has a high thermal conductivity.

Here, the silicon carbide ceramic material refers to a material having a silicon carbide content of about 60% by weight or more.

The plug 52 and the cell wall 53 that configure the porous ceramic member 50 are desirably made from the same porous ceramic material. With this arrangement, the contact strength between the two members is increased, and by adjusting the porosity of the plug 52 in the same manner as the cell walls 53, the coefficient of thermal expansion of the cell walls 53 and the coefficient of thermal expansion of the plug 52 are properly adjusted so that it becomes possible to prevent a gap from being generated between the plug 52 and the cell walls 53 due to a thermal stress upon production and in use and also to readily prevent cracks from occurring in the plug 52 and at portions of the cell walls 53 that are made in contact with the plug 52. Here, the cell walls refer to both of the cell wall separating the cells 51 and the peripheral portion thereof.

With respect to the thickness of the plug 52, although not particularly limited, in the case where the plug 52 is made from porous silicon carbide, it is desirably set to at least about 1 mm and at most about 20 mm, more desirably in the range of about 2 mm to about 10 mm.

In the aggregated honeycomb structured body 40, the sealing material layer (adhesive layer) 41, which is formed between the porous ceramic members 50, also functions as a bonding material used for binding a plurality of the porous ceramic members 50 to one another. In contrast, the sealing material layer (coat layer) 42, which is formed on the peripheral face of the ceramic block 45, is also allowed to function as a sealing material used for preventing exhaust gases passing through the cells from leaking from the peripheral face of the ceramic block 45 when the aggregated honeycomb structured body 40 is placed in an exhaust passage of an internal combustion engine, and as a reinforcing member used for adjusting the shape thereof.

Here, in the porous ceramic member 50, the adhesive layer 41 and the coat layer 42 may be formed by using the same material, or may be formed by using different materials. In the case where the adhesive layer 41 and the coat layer 42 are made from the same material, the compounding ratio of materials thereof may be the same or may be different. Moreover, the material may have either a dense structure or a porous structure.

With respect to the material used for forming the adhesive layer 41 and the coat layer 42, not particularly limited, for example, a material, made from inorganic fibers and/or inorganic particles in addition to an inorganic binder and an organic binder, may be used.

With respect to the above-mentioned inorganic binder, for example, silica sol and alumina sol may be used. Each of these materials may be used alone, or two or more kinds of these may be used in combination. Of the above-mentioned inorganic binders, silica sol is more desirably used.

With respect to the organic binder, examples thereof include: polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include: ceramic fibers such as silica-alumina, mullite, alumina and silica. Each of these may be used alone, or two or more kinds of these may be used in combination. Among the inorganic fibers, silica-alumina fibers are more desirably used.

With respect to the inorganic particles, for example, carbides, nitrides and the like may be used, and more specifically, inorganic powder, made from silicon carbide, silicon nitride, boron nitride or the like, may be used. Each of these may be used alone, or two or more kinds of these may be used in combination. Among the above-mentioned inorganic particles, silicon carbide, which is superior in thermal conductivity, is more desirably used.

Moreover, a pore-forming agent, such as balloons that are fine hollow spheres composed of oxide-based ceramics, spherical acrylic particles and graphite, may be added to the above-mentioned paste used for forming the sealing material layer, if necessary.

With respect to the above-mentioned balloons, not particularly limited, for example, alumina balloons, glass microballoons, shirasu balloons, fly ash balloons (FA balloons) mullite balloons and the like may be used. Among these, alumina balloons are more desirably used.

Next, the following description will discuss an embodiment of a manufacturing method of the aggregated honeycomb structured body.

First, an extrusion-molding process is carried out by using material paste mainly composed of the above-mentioned ceramic material so that a square-pillar shaped ceramic molded body is manufactured.

In order to prepare the material paste, particularly, a ceramic powder, a binder and a dispersant solution are mixed by an attritor or the like, and sufficiently kneaded by a kneader or the like, and then extrusion-molded.

With respect to the particle size of the ceramic powder, although not particularly limited, those which are less susceptible to shrinkage in the succeeding firing process are desirably used, and for example, those particles, prepared by combining 100 parts by weight of particles having an average particle diameter of at least about 0.3 μm and at most about 70 μm with at least about 5 parts by weight and at most about 65 parts by weight of particles having an average particle diameter in the range of about 0.1 μm to about 1.0 μm, are preferably used.

The pore diameter and the like of the porous ceramic member can be adjusted by adjusting the firing temperature and the particle size of the ceramic powder.

Here, the ceramic powder may be subjected to an oxidizing process in advance.

With respect to the above-mentioned binder, not particularly limited, examples thereof include: methylcellulose, carboxy methylcellulose, hydroxy ethylcellulose, polyethylene glycol, phenolic resin, epoxy resin and the like.

In general, the compounding amount of the above-mentioned binder is desirably set to at least about 1 part by weight and at most about 15 parts by weight with respect to 100 parts by weight of the ceramic powder.

With respect to the dispersant solution, not particularly limited, examples thereof include: an organic solvent such as benzene; alcohol such as methanol; water, and the like.

An appropriate amount of the above-mentioned dispersant solution is mixed therein so that the viscosity of the material paste is set within a fixed range.

Moreover, a molding auxiliary may be added to the material paste, if necessary.

With respect to the molding auxiliary, not particularly limited, examples thereof include ethylene glycol, dextrin, fatty acid, fatty acid soap, polyvinyl alcohol and the like.

Moreover, in order to provide a desired porosity, a pore-forming agent, such as balloons that are fine hollow spheres composed of oxide-based ceramics, spherical acrylic particles and graphite, may be added to the above-mentioned material paste.

With respect to the above-mentioned balloons, not particularly limited, for example, alumina balloons, glass microballoons, shirasu balloons, fly ash balloons (FA balloons), mullite balloons and the like may be used. Among these, alumina balloons are more desirably used.

Next, the above-mentioned ceramic molded body is dried by using a drier such as a microwave drier, a hot-air drier, a dielectric drier, a reduced-pressure drier, a vacuum drier and a frozen drier so that a ceramic dried body is formed. Thereafter, a predetermined amount of plug paste, which forms plugs, is injected into the end portion on the outlet side of the inlet-side group of cells and the end portion on the inlet side of the outlet-side group of cells so that the cells are sealed.

With respect to the plug paste, although not particularly limited, such paste as to set the porosity of a plug produced through the succeeding processes to at least about 60% and at most about 95% is desirably used, and for example, the same paste as the material paste may be used.

Next, the ceramic dried body filled with the plug paste is subjected to degreasing (for example, at least about 200° C. and at most about 500° C.) and firing processes (for example, at least about 1400° C. and at most about 2300° C.) under predetermined conditions so that a porous ceramic member 50, made from porous ceramics and constituted by a single sintered body as a whole, is manufactured.

Here, with respect to the degreasing and firing conditions of the ceramic dried body, it is possible to apply conditions that have been conventionally used for manufacturing a filter made from porous ceramics.

Next, an adhesive paste to form the adhesive layer 41 is applied to each of the side faces of the porous ceramic member 50 with an even thickness to form an adhesive paste layer, and by repeating a process for successively laminating another porous ceramic member 50 on this adhesive paste layer, a porous ceramic member aggregated body having a predetermined size is manufactured.

With respect to the material for forming the adhesive paste, since it has been explained, the explanation thereof is omitted.

Next, the porous ceramic member aggregated body is heated so that the adhesive paste layer is dried and solidified to form the adhesive layer 41.

Moreover, the porous ceramic member aggregated body in which a plurality of the porous ceramic members 50 are bonded to one another through the adhesive layers 41 is subjected to a cutting process by using a diamond cutter and the like so that a ceramic block 45 having a cylindrical shape is manufactured.

By forming a sealing material layer 42 on the outer periphery of the ceramic block 45 by using the sealing material paste, an aggregated honeycomb structured body 40 in which the sealing material layer 42 is formed on the peripheral portion of the cylindrical ceramic block 45 having a plurality of the porous ceramic members 50 bonded to one another through the adhesive layers 41.

Thereafter, an oxide catalyst is supported on the honeycomb structured body so that an aggregated honeycomb structured body is manufactured. The supporting process of the catalyst may be carried out on the porous ceramic member prior to the manufacturing of the aggregated body. With respect to the method for supporting the oxide catalyst, a similar method as the method used for supporting a catalyst on the metal lamination member in the manufacturing method for the above-mentioned laminated honeycomb structured body may be used.

The following description will discuss an embodiment of an integral honeycomb structured body.

Figure 5A:
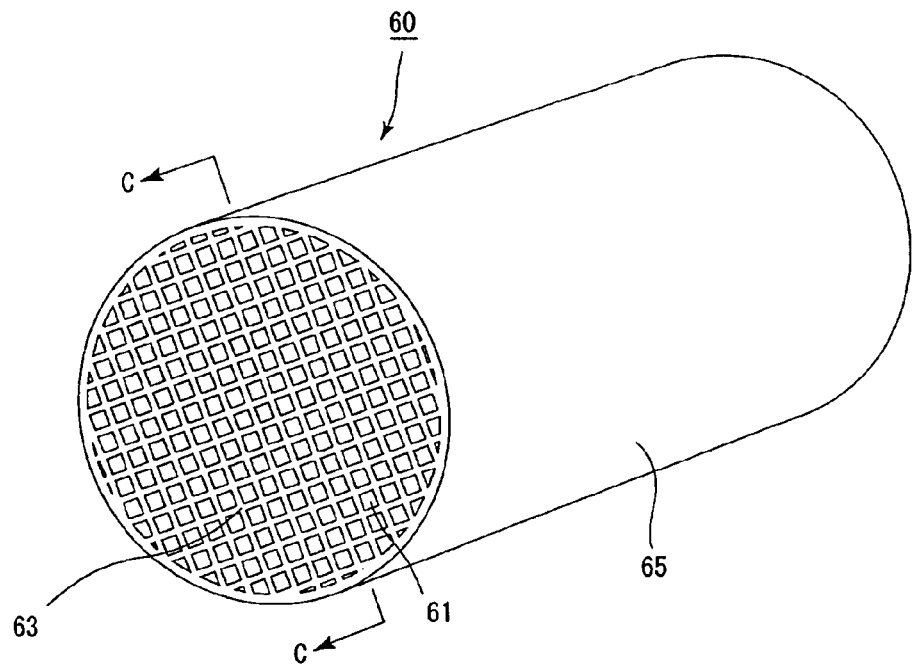
FIG. 5A is a cross-sectional view that schematically shows one example of a honeycomb structured body of the present invention.
Figure 5B:
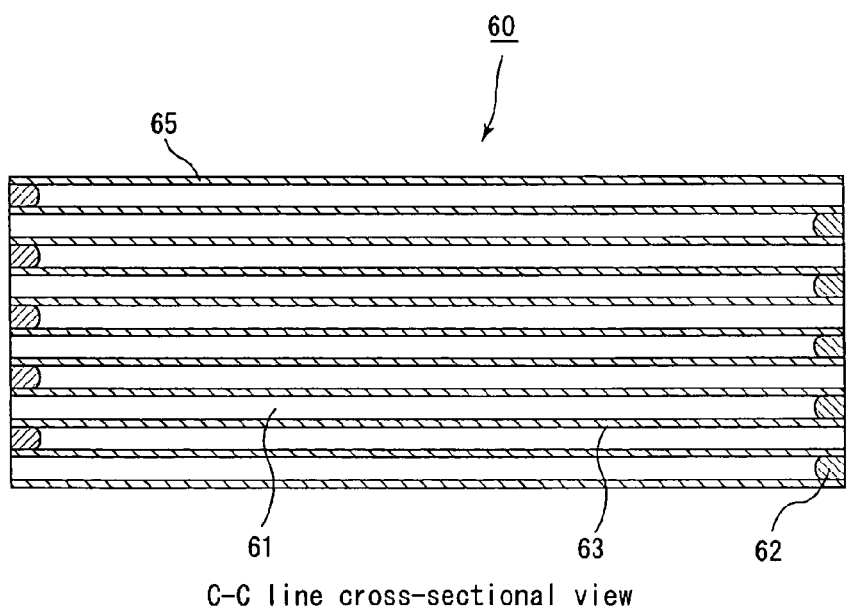
FIG. 5B is a cross-sectional view taken along line C-C thereof.

FIG. 5A is a perspective view that schematically shows one example of an integral honeycomb structured body, and FIG. 5B is a cross-sectional view taken along line C-C of FIG. 5A.

As shown in FIGS. 5A and 5B, the integral honeycomb structured body 60 is formed by a porous ceramic member (cylindrical ceramic block 65) in which a number of cells 61 are placed in parallel with one another in the longitudinal direction with a cell wall (wall portion) 63 interposed therebetween.

As shown in FIG. 5B, in the integral honeycomb structured body 60, the ceramic block 65 has a structure in which either one of the end portions of the cell 61 is sealed with a plug 62.

In other words, in the ceramic block 65 of the integral honeycomb structured body 60, predetermined cells 61 are plugged by the plugs 62 at one of the end portions, and at the other end portion thereof, the cells 61 that have not been plugged by the plugs 62 are plugged by the plugs 62.

In this structure, exhaust gases that have flowed into one cell 61 are always allowed to flow out of another cell 61 after having passed through the cell wall 63 separating the cells 61 so that the cell wall 63 separating the cells 61 from each other is allowed to function as a particle capturing filter.

Moreover, an oxide catalyst is supported on the ceramic block 65.

Although not shown in FIGS. 5A and 5B, in the same manner as the aggregated honeycomb structured body 45 shown in FIG. 3, a sealing material layer (coat layer) may be formed on the periphery of the ceramic block 65.

With respect to the porous ceramic material forming the integral honeycomb structured body, for example, the same porous ceramic material forming the above-mentioned aggregated honeycomb structured body may be used.

Among those materials, oxide ceramics such as cordierite may be preferably used. This material cuts manufacturing costs, and has a comparatively low coefficient of thermal expansion so that breakage during use thereof hardly occurs.

The desirable apparent density of the integral honeycomb structured body according to the above-mentioned embodiment is the same as the desirable apparent density of the embodiment for the above-mentioned aggregated honeycomb structured body, and the reasons for the setting are also the same.

Moreover, in the integral honeycomb structured body according to the above-mentioned embodiment, with respect to the material for the plug, the thickness of cell walls, the material for the sealing material layer, etc., those factors that are the same as those of the embodiment of the aggregated honeycomb structured body may be used; therefore, detailed description thereof is omitted herein.

The following description will discuss one example of an embodiment of a manufacturing method of the integral honeycomb structured body.

First, an extrusion-molding process is carried out by using material paste mainly composed of the above-mentioned ceramic material so that a cylindrical ceramic molded body to form a ceramic block is manufactured. Here, except that the shape of the molded body is a cylinder and that the dimension is larger in comparison with the porous ceramic member, the same binder, dispersant and the like as those of the aggregated honeycomb structured body are used and the molded body is formed by using the same method; therefore, detailed description thereof is omitted herein.

Next, in the same manner as the embodiment for the manufacturing process of the aggregated honeycomb structured body, the above-mentioned ceramic molded body is dried by using a drier such as a microwave drier, a hot-air drier, a dielectric drier, a reduced-pressure drier, a vacuum drier and a frozen drier so that a ceramic dried body is formed. Thereafter, a predetermined amount of plug paste, which forms a plug, is injected into the end portion on the outlet side of the inlet-side group of cells and the end portion on the inlet side of the outlet-side group of cells so that the cells are sealed.

Thereafter, in the same manner as the embodiment for the manufacturing process of the aggregated honeycomb structured body, the degreasing and sintering processes are carried out to manufacture a ceramic block, and an oxide catalyst is supported thereon by using the above-mentioned method; thereafter, if necessary, the sealing material layer is formed on the outer periphery of the ceramic block so that an integral honeycomb structured body is manufactured.

Although the use of the embodiments of the honeycomb structured body according to the present invention is not particularly limited, it is applied to, for example, an exhaust gas purifying device for a vehicle.

The following description will discuss an embodiment of the exhaust gas purifying device according to the present invention that uses the above-mentioned honeycomb structured bodies.

The embodiment to the exhaust gas purifying device in accordance with the present invention comprises the embodiment of the honeycomb structured body of the present invention installed in an exhaust gas flow path; and a catalyst supporting carrier supporting a noble metal catalyst and being placed on the upstream side of the honeycomb structured body.

Referring to the drawings, the following description will discuss an embodiment of the exhaust gas purifying device according to the present invention.

Figure 6:
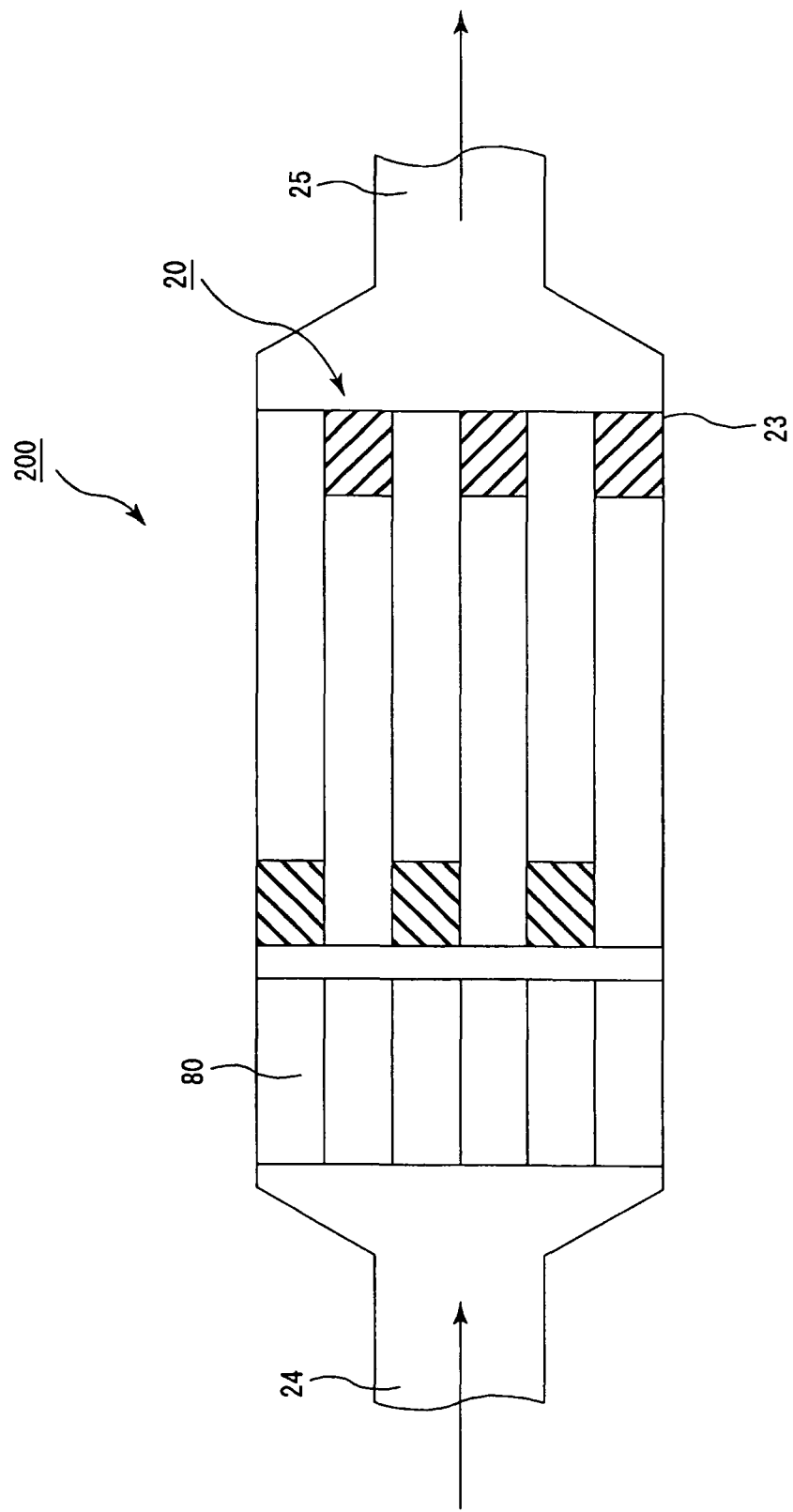
FIG. 6 is a cross-sectional view that schematically shows one example of an exhaust gas purifying device of the present invention.

FIG. 6 is a cross-sectional view that schematically shows one example of the exhaust gas purifying device of the present invention.

As shown in FIG. 6, an exhaust gas purifying device 200 has a structure in which the honeycomb structured body 20 and the catalyst supporting carrier 80 of the present invention are placed in a metal casing 23 that forms an exhaust gas passage so that the catalyst supporting carrier 80 is located on the upstream side of the honeycomb structured body 20. Moreover, an introducing pipe 24 that is connected to an internal combustion system such as an engine is connected to the end of the metal casing 23 on the side to which exhaust gases are directed, and an exhaust pipe 25 externally coupled is connected to the other end of the metal casing 23. Here, in FIG. 6, the arrow indicates the flow of exhaust gases.

Here, with respect to the catalyst supporting carrier, the aggregated honeycomb structured body and the integral honeycomb structured body, these members are desirably placed inside the metal casing with hold-sealing members being wound around the peripheral portions thereof. Moreover, upon being placed inside the metal casing, the laminated honeycomb structured body may be wrapped with the hold-sealing member on its peripheral portion, or may be placed without being wrapped with the hold-sealing member.

A noble metal catalyst is supported on the catalyst supporting carrier 80.

With respect to the noble metal catalyst, for example, platinum, palladium and rhodium may be used.

With respect to the amount of the supported noble metal catalyst, the lower limit value is desirably set to about 2 g/L and the upper limit value is desirably set to about 10 g/L.

The amount of the supported catalyst of at least about 2 g/L and at most about 10 g/L tends to enable the exhaust gas purifying device to sufficiently convert CO and HC in exhaust gases, and the amount of supported catalyst exceeding about 10 g/L hardly improves the converting performance.

In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be supported on the catalyst supporting carrier.

Moreover, when the above-mentioned catalyst is adhered to the honeycomb structured body, the catalyst may be adhered thereto after the surface has been preliminarily coated with a catalyst supporting layer made of alumina or the like. Examples of the material for the catalyst supporting layer include oxide ceramics, such as alumina, titania, zirconia and silica.

Here, with respect to the base member for the catalyst supporting carrier, not particularly limited as long as it can support a noble metal catalyst, for example, a porous ceramic material, metal or the like may be used.

In the exhaust gas purifying device 200 having the above-mentioned configuration, exhaust gases (including toxic gas components and particulates), discharged from the internal-combustion system such as an engine, are directed into the metal casing 23 through the introducing pipe 24, and first allowed to pass through the inside of the catalyst supporting carrier 80.

Thus, the toxic gas components, such as CO, HC and NOx in the exhaust gases, are converted in the catalyst supporting carrier 80.

Next, the exhaust gases in which the toxic gas components have been converted are directed into the honeycomb structured body of the present invention on which the oxide catalyst is supported so that particulates thereof are captured and purified (filtered) by the cells and cell walls in the honeycomb structured body, and then discharged through the exhaust pipe 25.

Therefore, in the embodiment of the exhaust gas purifying device according to the present invention, the toxic gas components are converted by the catalyst supporting carrier, and the particulates are purified (filtered) by the honeycomb structured body.

In the exhaust gas purifying device having the above-mentioned configuration, the catalyst supporting carrier on which the noble metal catalyst has been supported so as to mainly convert toxic gas components and the honeycomb structured body on which the oxide catalyst is supported so as to mainly purify (filter) particulates are installed separately; therefore, it becomes possible to effectively carry out the converting process for the toxic gas components and the purifying (filtering) process for particulates.

Moreover, in the above-mentioned embodiment of the exhaust gas purifying device according to the present invention, since the catalyst supporting carrier supporting a noble metal catalyst is placed on the upstream side of the honeycomb structured body, heat generated upon converting exhaust gases by using the catalyst supporting carrier can be easily utilized for burning particulates so that it becomes easier for the exhaust gas purifying device to efficiently purify exhaust gases, and consequently to regenerate the honeycomb structured body effectively.

The following description will briefly discuss one example of a manufacturing method for the catalyst supporting carrier.

With respect to the manufacturing method of the catalyst supporting carrier, for example, a method in which a base member made of the above-mentioned porous ceramic material or the like is prepared and an alumina film is formed on the surface of the base member thereafter, so that a catalyst is supported on this alumina film, is proposed.

With respect to the method for forming the alumina film, for example, a method in which the base member is impregnated with a solution of a metal compound containing aluminum such as $Al(NO_3)_3$ and then heated and a method in which the base member is impregnated with a solution containing alumina powder and then heated are proposed.

With respect to the method for supporting the catalyst on the alumina film, for example, a method in which a metal lamination member is impregnated with, for example, a solution of diammine dinitro platinum nitric acid ([Pt(NH$_3$)$_2$ (NO$_2$)$_2$]HNO$_3$) and then heated is proposed.

Moreover, the catalyst may also be supported on the base member through a method in which the base member is impregnated with alumina slurry in which a catalyst made from noble metal such as Pt is supported and then taken out and heated.

EXAMPLES

The following description will discuss the present invention in detail by means of examples; however, the present invention is not intended to be limited by these examples.
(Manufacturing of Aggregated Honeycomb Structured Body A)

Coarse powder of α-type silicon carbide having an average particle diameter of 22 μm (7000 parts by weight) and fine powder of α-type silicon carbide having an average particle diameter of 0.5 μm (3000 parts by weight) were wet-mixed, and to 10000 parts by weight of the resulting mixture were added and kneaded 550 parts by weight of an organic binder (methyl cellulose), 330 parts by weight of a plasticizer (UNI-LUBE made by NOF Corp.), 150 parts by weight of glycerin serving as a lubricant and 2000 parts by weight of water to obtain a mixed composition, and this was then extrusion-molded to manufacture a raw molded body having a rectangular pillar shape as shown in FIG. 4A.

Next, after the above-mentioned raw molded body had been dried by using a micro-wave drier or the like to prepare a ceramic dried body, predetermined cells were filled with a plug paste having the same composition as the raw molded body.

After this had been again dried by using a drier, the resulting product was degreased at 400° C., and fired at 2200° C. in a normal-pressure argon atmosphere for 3 hours to manufacture a porous ceramic member 50, which was a silicon carbide sintered body with a porosity of 40% and an average pore diameter of 12.5 μm, having a size of 34.3 mm×34.3 mm×150 mm, the number of cells 51 (cell density) of 46.5 pcs/cm$^2$ and a thickness of the cell walls 23 of 0.20 mm.

By using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of the porous ceramic members 50 were bonded to one another, and this was dried at 120° C. and then cut by using a diamond cutter so that a cylindrical ceramic block 45 having a thickness of the adhesive layer of 1 mm was manufactured.

Next, silica-alumina fibers (average fiber length: 100 μm, average fiber diameter 10 μm) (23.3% by weight), which served as inorganic fibers, silicon carbide powder having an average particle diameter of 0.3 μm (30.2% by weight), which served as inorganic particles, silica sol (SiO$_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material-paste layer having a thickness of 0.2 mm was formed on the peripheral portion of the ceramic block 45 by using the above-mentioned sealing material paste. Further, this sealing material-paste layer was dried at 120° C. so that a cylindrical aggregated honeycomb structured body A having a size of 143.8 mm in diameter×150 mm in length (capacity 2.44 liters) was manufactured.

Here, the apparent density of the porous ceramic members comprising the aggregated honeycomb structured body A was 0.49 g/cm$^3$.
(Manufacturing of Aggregated Honeycomb Structured Body B and F)

Coarse powder of α-type silicon carbide having an average particle diameter of 22 μm (7000 parts by weight) and fine powder of α-type silicon carbide having an average particle diameter of 0.5 μm (3000 parts by weight) were wet-mixed, and to 10000 parts by weight of the resulting mixture were added and kneaded 1100 parts by weight of an organic binder (methyl cellulose), 330 parts by weight of a plasticizer (UNI-LUBE made by NOF Corp.), 150 parts by weight of glycerin serving as a lubricant and 2000 parts by weight of water to prepare a mixed composition, and the same processes as those of the aggregated honeycomb structured body A were carried out except that this mixed composition was used so that aggregated honeycomb structured bodies B and F having values as shown in Table 1 in the thickness of cell walls, cell density, porosity, pore diameter and apparent density were manufactured.

Here, the apparent densities of the porous ceramic members forming the aggregated honeycomb structured bodies B and F were 0.55 g/cm$^3$ and 0.73 g/cm$^3$ respectively.
(Manufacturing of Aggregated Honeycomb Structured Body C)

Coarse powder of α-type silicon carbide having an average particle diameter of 22 μm (7000 parts by weight) and fine powder of α-type silicon carbide having an average particle diameter of 0.5 μm (3000 parts by weight) were wet-mixed, and to 10000 parts by weight of the resulting mixture were added and kneaded 770 parts by weight of an organic binder (methyl cellulose), 330 parts by weight of a plasticizer (UNI-LUBE made by NOF Corp.), 150 parts by weight of glycerin serving as a lubricant and 2000 parts by weight of water to prepare a mixed composition, and the same processes as those of the aggregated honeycomb structured body A were carried out except that this mixed composition was used so that an aggregated honeycomb structured body C having values as shown in Table 1 in the thickness of cell walls, cell density, porosity, pore diameter and apparent density was manufactured.

Here, the apparent density of the porous ceramic members forming the aggregated honeycomb structured body C was 0.68 g/cm$^3$.
(Manufacturing of Integral Honeycomb Structured Body D)

Talc powder having an average particle diameter of 10 μm (40 parts by weight), kaolin powder having an average particle diameter of 9 μm (10 parts by weight), alumina powder having an average particle diameter of 9.5 μm (17 parts by weight), aluminum hydroxide powder having an average particle diameter of 5 μm (16 parts by weight) and silica powder having an average particle diameter of 10 μm (15 parts by weight) were wet-mixed, and to 98 parts by weight of the resulting mixture were added and kneaded acryl particles having an average particle diameter of 40 μm (10 parts by weight), an organic binder (carboxymethyl cellulose) (5 parts by weight), a dispersant (UNILUBE made by NOF Corp.) (4 parts by weight), a solvent (diethylene glycol mono-2-ethyl-hexyl ether, KYOWANOL OX20 made by Kyowa Hakko Chemical Co., Ltd) (11 parts by weight) and another dispersant (2 parts by weight), and the resulting matter was extrusion-molded so that a cylindrical raw molded body shown in FIG. 5A was prepared.

Here, the acryl particles were added as a pore-forming agent used for forming pores.

Next, after the above-mentioned raw molded body had been dried by using a micro-wave drier or the like to prepare a ceramic dried body, predetermined cells were filled with a plug paste having the same composition as the raw molded body.

After this had been again dried by using a drier, the resulting product was degreased at 400° C., and fired at 1400° C. in a normal-pressure atmosphere for 3 hours to manufacture a cylindrical honeycomb structured body 60 made from cordierite having a size of 143.8 mm in diameter×150 mm in length, with an average pore diameter of 12.5 μm, a porosity of 45%, the number of cells 61 of 46.5 pcs/cm² and a thickness of almost all the wall portions 63 of 0.25 mm. Here, the particle diameter of ceramic particles in the honeycomb structured body 60 was observed by SEM and found to be 10 μm.

Moreover, the apparent density of the porous ceramic members forming the integral honeycomb structured body D was 0.43 g/cm³.

(Manufacturing of Laminated Honeycomb Structured Body E)

(1) Preparation Process of Sheet-Forming Slurry

First, alumina fibers (50 parts by weight), glass fibers (average fiber diameter: 9 μm, average fiber length: 3 mm) (50 parts by weight) and an organic binder (polyvinyl alcohol-based fibers) (10 parts by weight) were dispersed in a sufficient amount of water, and this was sufficiently stirred to prepare a sheet-forming slurry.

(2) Sheet-Forming Process and Cell-Forming Process

The slurry obtained in the process (1) was formed into a sheet by using a mesh having a diameter of 143.8 mm, and the resulting matter was dried at 135° C. so that a sheet-shaped inorganic composite body having a diameter of 143.8 mm and a thickness of 4 mm was obtained. Next, this was subjected to a stamping process so that cells having a cell density of 3.72 pcs/cm² and a cell-wall thickness of 2 mm were formed over the entire face of the sheet-shaped inorganic composite body.

(3) Heating Treatment Process

The sheet-shaped inorganic composite body obtained in the process (2) was subjected to a heating treatment at 950° C. for one hour with a pressure being applied thereto so that an inorganic fiber lamination member was obtained. Here, in this process, the alumina fibers are anchored with one another through glass.

(4) Acid Treatment and Quenching Treatment Process

The inorganic fiber lamination member obtained in the process (3) was immersed in 4 mol/L of a HCl solution at 90° C. for one hour to be subjected to an acid treatment, and was then subjected to a quenching treatment at 1050° C. for 5 hours. Thus, the resulting member had a porosity of 92% and a thickness of 1 mm.

(5) Manufacturing of Lamination Member for the End Portion (Metal Plate-Type Member Having a Dense Structure)

After a Ni—Cr alloy metal member (metal plate having a dense structure) had been machined into a disc shape of 132 mm in diameter×150 mm in thickness, the resulting member was further subjected to a laser machining process so that a lamination member for the end portion in which cells were formed with a diced pattern, with a cell density of about 1.8 to 1.9 pcs/cm² and a cell-wall thickness of 4 mm was manufactured.

Here, the lamination member for the end portion, which had cells formed with the diced pattern, was set to a cell density that was almost half that of the lamination member.

(6) Laminating Process

First, in a separated process, a metal casing to which a pressing metal member was attached to one side thereof was placed, with the side bearing the metal member attached thereto facing down. After one of the lamination members for the end portion obtained in the process (5) had been laminated, 93 of the inorganic fiber lamination members obtained in the process (4) were laminated thereon, and lastly, one of the lamination members for an end portion was laminated thereon, and this was further subjected to a pressing process. Then, another pressing metal member was also put on the other side and secured thereon so that a laminated honeycomb structured body E having a length of 150 mm was manufactured. Here, the honeycomb structured body, obtained through the pressing process, had a porosity of 90% and an average pore diameter of 35 μm. In this process, the respective sheets were laminated so that the cells were superposed on one another.

Here, the laminated honeycomb structured body E had an apparent density of 0.18 g/cm³.

TABLE 1

| | Material | Thickness of cell wall (mm) | Cell density (cells/cm²) | Porosity (%) | Pore diameter (μm) | Apparent density (g/cm³) | Size (mm) |
|---|---|---|---|---|---|---|---|
| Honeycomb structured body A | SiC | 0.2 | 46.5 | 40 | 12.5 | 0.49 | ϕ143.8 × 150 |
| Honeycomb structured body B | SiC | 0.25 | 46.5 | 45 | 12.5 | 0.55 | ϕ143.8 × 150 |
| Honeycomb structured body C | SiC | 0.4 | 26.4 | 42 | 11 | 0.68 | ϕ143.8 × 150 |
| Honeycomb structured body D | Cordierite | 0.25 | 46.5 | 45 | 12.5 | 0.43 | ϕ143.8 × 150 |
| Honeycomb structured body E | Alumina fibers, etc. | 2 | 3.72 | 90 | 35 | 0.18 | ϕ143.8 × 150 |
| Honeycomb structured body F | SiC | 0.42 | 31.0 | 45 | 12.5 | 0.73 | ϕ143.8 × 150 |

Examples 1 to 10, Comparative Examples 1 to 6, Test Examples 1 and 2

Either an oxide catalyst or a platinum catalyst was supported on each of the honeycomb structured bodies A to F manufactured through the above-mentioned methods, and an exhaust gas purifying device was prepared, installing therein the honeycomb structured body with each of these catalysts supported thereon, and the initial capturing efficiency and regenerating rate of the honeycomb structured body were evaluated. The results are shown in Table 2. In Comparative Example 5, no catalyst was supported on the honeycomb structured body.

In the case where $CeO_2$ and $ZrO_2$ serving as an oxide catalyst were supported on each of the aggregated honeycomb structured body and the integral honeycomb structured body, the following method was used: the honeycomb structured body was immersed for 5 minutes in a solution containing 10 g of CZ ($nCeO_2$-$mZrO_2$), 40 ml of water and an appropriate amount of a pH-adjusting agent, and then subjected to a firing process at 500° C.

In the case where $CeO_2$ and $CuO_2$ serving as an oxide catalyst were supported on the aggregated honeycomb structured body, the following method was used: the honeycomb structured body was immersed for 5 minutes in a solution containing 10 g of $nCeO_2$-$mCuO_2$, 40 ml of water and an appropriate amount of a pH-adjusting agent, and then subjected to a firing process at 500° C.

In the case where $CeO_2$ and $FeO_2$ serving as an oxide catalyst were supported on the aggregated honeycomb structured body, the following method was used: the honeycomb structured body was immersed for 5 minutes in a solution containing 10 g of $nCeO_2$-$mFeO_2$, 40 ml of water and an appropriate amount of a pH-adjusting agent, and then subjected to a firing process at 500° C.

In the case where $LaCoO_3$ serving as an oxide catalyst was supported on the aggregated honeycomb structured body, 0.01 mol of $La(NO_3)_3.6H_2O$, 0.01 mol of $Co(OCOCH_3)_2.4H_2O$ and 0.024 mol of $C_6H_8O_7.H_2O$ (citric acid) were mixed and stirred in 20 ml of an ethanol solvent to prepare a $LaCoO_3$ precursor sol. The honeycomb structured body was immersed in this sol, and after having been taken out, the excessive sol was removed through a suction process, dried at 100° C., and then subjected to a firing process at 600° C. for one hour.

Here, through X-ray diffraction measurements, a perovskite structure of $LaCoO_3$ was confirmed therein.

In the case where $CeO_2$ and $ZrO_2$ serving as an oxide catalyst were supported on the laminated honeycomb structured body constituted by the inorganic fiber lamination members and the metal lamination members, the following method was used: the respective lamination members were immersed for 5 minutes in a solution containing 10 g of $CZ(nCeO_2$-$mZrO_2)$, 40 ml of water and an appropriate amount of a pH-adjusting agent, and then subjected to a firing process at 500° C.

With respect to the method for coating the aggregated honeycomb structured body and the integral honeycomb structured body with a platinum catalyst, the honeycomb structured body was impregnated with an alumina slurry in which Pt was supported (Pt density: 5% by weight) for 2 minutes, and then heated at 500° C. so that the catalyst was supported thereon. Here, the amount of supported Pt was 5 g/L, and the amount of supported alumina was 50 g/L.

With respect to the method for coating the laminated honeycomb structured body constituted by the inorganic fiber lamination members and the metal lamination members with a platinum catalyst, the honeycomb structured body was impregnated with an alumina slurry in which Pt was supported (Pt density: 5% by weight) for 2 minutes, and then heated at 500° C. so that the catalyst was supported thereon. Here, the amount of supported Pt was 5 g/L, and the amount of supported alumina was 50 g/L.

Moreover, an exhaust gas purifying device used for measuring the initial capturing efficiency and the like was assembled by using the following method.

Figure 7:
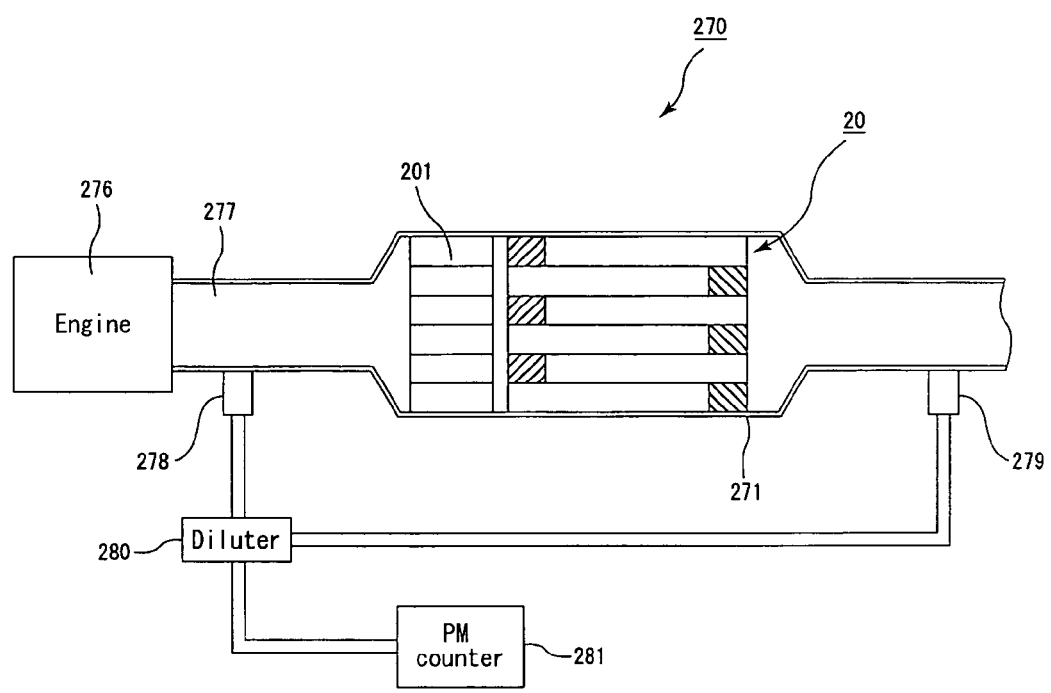
FIG. 7 is an explanatory drawing that shows the exhaust gas purifying device that has been assembled in Examples.

The exhaust gas purifying device as shown in FIG. 7 was assembled. FIG. 7 is an explanatory drawing of the exhaust gas purifying device.

The exhaust gas purifying device 270 used for measuring the pressure loss was prepared as a scanning mobility particle sizer (SMPS) provided with a common-rail-type diesel engine 276 of 2 L, an exhaust gas pipe 277 that allows exhaust gases from the engine 276 to flow therein, a metal casing 271 that is connected to the exhaust gas pipe 277 and houses the honeycomb structured body 20 and the catalyst supporting carrier 201, a sampler 278 that samples exhaust gases prior to the flow through the honeycomb structured body 20, a sampler 279 that samples exhaust gases after the flow through the honeycomb structured body 20, a diluter 80 that dilutes the exhaust gases that have been sampled by the samplers 278 and 279 and a PM counter 281 (made by TSI Inc., Condensation Particle Counter 3022A-S) that measures the amount of particulates contained in the diluted exhaust gases.

Here, the honeycomb structured body 20 and the catalyst supporting carrier 201 were placed with a gap of 10 mm.

Moreover, with respect to the catalyst supporting carrier, a catalyst supporting carrier, which was prepared by supporting a platinum catalyst of 5 g/L and alumina 150 g/L on a honeycomb structured body that was manufactured through the same method as that of the honeycomb structured body D except that its cell structure (thickness of the cell wall: 0.175 mm, the cell density: 62 pcs/$cm^2$) was different, was used. Here, with respect to the method for supporting the platinum catalyst thereon, the same method as that used for supporting a platinum catalyst on the aggregated honeycomb structured body or the like was used. Here, the size of the catalyst supporting carrier was set to 0143.8×75 mm.

Moreover, upon assembling the exhaust gas purifying device, the catalyst supporting carrier, the aggregated honeycomb structured body and the integral honeycomb structured body were installed in the metal casing with hold-sealing members being wound around the peripheral portions, and the laminated honeycomb structured body was installed without any hold-sealing member being wound around the peripheral portion.

The following description will discuss measuring procedures:

(1) Measurements of the Initial Capturing Efficiency

The engine 276 was driven at the number of revolutions of 2000 $min^{-1}$ with a torque of 47 Nm so that exhaust gases from the engine 276 were allowed to flow through the honeycomb structured body 20. In this case, the amount of PM $P_0$ prior to the flow through the honeycomb structured body 20 and the amount of exhaust gases $P_1$ after the flow through the honeycomb structured body 20 were confirmed based upon the number of PM particles counted by using the PM counter 281. Then, the initial capturing efficiency was calculated by using the following equation (1):

$$\text{Initial collecting efficiency (\%)} = (P_0 - P_1)/P_0 \times 100 \quad (1)$$

The results are shown in Table 2.

In the present specification, the initial period in the initial capturing efficiency refers to a period in which 1 g/L of PM has been deposited.

(2) Measurements of Regenerating Rate

First, the weight of a honeycomb structured body with no particulates deposited thereon was measured.

Next, the engine 276 was driven at the number of revolutions of 2000 min$^{-1}$ with a torque of 40 Nm for a predetermined period of time so that particulates the amount of which was shown in Table 1 were deposited on the honeycomb structured body. Here, the honeycomb structured body was once taken out, and the weight thereof was measured.

Thereafter, the engine was driven under a post-injection system for 10 minutes so that the honeycomb structured body 20 was subjected to a regenerating process, and the weight of the honeycomb structured body after the regenerating process was measured.

Based upon the weight of the reduced particulates (PM), the regenerating rate (%) was calculated using the following equation (2):

Regenerating rate (%)=(PM weight before regeneration−PM weight after regeneration)/PM weight before regeneration (2)

The results are shown in Table 2.

TABLE 2

|  | Honeycomb structured body | Catalyst | Catalyst amount (g/L) | Initial collecting efficiency (%) | PM deposition amount before regenerating process (g/L) | Regenerating rate (%) |
|---|---|---|---|---|---|---|
| Example 1 | A | $CeO_2 + ZrO_2$ | 30 | 100 | 6 | 91 |
| Example 2 | B | $CeO_2 + ZrO_2$ | 10 | 100 | 2 | 88 |
| Example 3 | B | $CeO_2 + ZrO_2$ | 10 | 100 | 6 | 88 |
| Example 4 | B | $CeO_2 + CuO_2$ | 15 | 100 | 6 | 87 |
| Example 5 | B | $CeO_2 + FeO_2$ | 20 | 100 | 6 | 85 |
| Example 6 | B | $LaCoO_3$ | 30 | 100 | 6 | 83 |
| Example 7 | C | $CeO_2 + ZrO_2$ | 30 | 100 | 6 | 81 |
| Example 8 | D | $CeO_2 + ZrO_2$ | 30 | 100 | 2 | 91 |
| Example 9 | E | $CeO_2 + ZrO_2$ | 10 | 100 | 2 | 98 |
| Example 10 | B | $CeO_2 + ZrO_2$ | 50 | 100 | 6 | 90 |
| Test Example 1 | D | $CeO_2 + ZrO_2$ | 30 | 100 | 6 | Erosion |
| Test Example 2 | B | $CeO_2 + ZrO_2$ | 8 | 100 | 6 | 76 |
| Comparative Example 1 | A | Pt | 5 | 100 | 6 | 67 |
| Comparative Example 2 | B | Pt | 5 | 100 | 2 | 60 |
| Comparative Example 3 | B | Pt | 5 | 100 | 6 | 60 |
| Comparative Example 4 | E | Pt | 5 | 100 | 2 | 78 |
| Comparative Example 5 | B | not supported | — | 100 | 6 | 55 |
| Comparative Example 6 | F | $CeO_2 + ZrO_2$ | 30 | 100 | 6 | 74 |

As clearly indicated by the results shown in Table 2, the honeycomb structured body relating to each of Examples had an initial collecting efficiency of 100%, and was able to maintain a high regenerating rate exceeding about 80%.

Moreover, based upon comparisons among the regenerating rates of Examples 3 to 6 and 10, it was clarified that a catalyst containing $CeO_2$ was desirably used from the viewpoint of ensuring a higher regenerating rate.

In contrast, in the honeycomb structured body relating to Test Example 1, erosion occurred during the regenerating process. This is presumably because, since the cordierite forming the honeycomb structured body has a heat resistant temperature of less than 1200° C., the temperature rises upon burning a large amount of particulates (6 g/L) to cause the erosion. Consequently, it is clarified that the heat resistant temperature of the honeycomb structured body is desirably set to about 1200° C. or more.

Moreover, although the honeycomb structured body relating to Test Example 2 exhibits a high regenerating rate in comparison with Comparative Example 3, its regenerating rate is 76%, which is inferior to those of Examples 3 to 6 and 10.

The reason for this is presumably because the amount of the supported oxide catalyst is small.

Moreover, the honeycomb structured bodies relating to Comparative Examples were generally inferior in the regenerating rate. The reason for this is presumably because, in Comparative Examples 1 to 5, no oxide catalyst is supported thereon, and in Comparative Example 6, the apparent density is too high.

What is claimed as new and desired to be secured by Letters Patent of the United States is:

1. A honeycomb structured body comprising:

a plurality of porous ceramic members being bound with one another through a sealing material layer which is formed between peripheries of said porous ceramic members, each of said porous ceramic members having a structure in which a plurality of cells are placed in parallel with one another in a longitudinal direction with a cell wall therebetween; and an oxide catalyst that is supported on at least one portion of said cell wall, wherein said oxide catalyst comprises $CeO_2$ and $ZrO_2$, and the amount of supported oxide catalyst is set to at least about 10 g/L and at most about 50 g/L with respect to the apparent volume of said honeycomb structured body, wherein said porous ceramic members are each made of a material that includes inorganic particles that is extrusion-molded to form a raw molded body of a rectangular pillar shape and fired at at least 1400° C. and at most 2300° C. to form a fired body, and wherein said porous ceramic member has an apparent density of about 0.7 g/cm³ or less and a porosity of at least about 40% and at most about 60%.

2. The honeycomb structured body according to claim 1, wherein a heat resistant temperature is about 1200° C. or more.

3. The honeycomb structured body according to claim 1, wherein said honeycomb structured body is mainly made from silicon carbide.

4. The honeycomb structured body according to claim 3, wherein the apparent density of said honeycomb structured body is at least about 0.4 g/cm³ and at most about 0.7 g/cm³.

5. The honeycomb structured body according to claim 3, wherein the distance between the adjacent cells of said honeycomb structured body is at least about 0.15 mm and at most about 0.5 mm.

6. The honeycomb structured body according to claim 3, wherein the aperture ratio of said honeycomb structured body is at least about 50% and at most about 80%.

7. The honeycomb structured body according to claim 1, wherein said honeycomb structured body comprises said plurality of porous ceramic members, wherein said porous ceramic members are bound to one another by said sealing material layer formed on outer peripheral walls of said porous ceramic members, and wherein said outer peripheral walls extend in the longitudinal direction.

8. The honeycomb structured body according to claim 1, wherein said porous ceramic member comprises at least one member selected from the group consisting of aluminum nitride, silicon nitride, boron nitride, silicon carbide, zirconium carbide, alumina, silica, and aluminum titanate.

9. The honeycomb structured body according to claim 1, wherein said porous ceramic member comprises silicon carbide, or silicon and silicon carbide.

10. The honeycomb structured body according to claim 3, wherein the apparent density of said honeycomb structured body is at least about 0.55 g/cm³ and at most about 0.7 g/cm³.

11. An exhaust gas purifying device comprising:
a honeycomb structured body, which is configured to be installed in an exhaust gas flow path, said honeycomb structured body comprising:
a plurality of porous ceramic members being bound with one another through a sealing material layer which is formed between peripheries of said porous ceramic members, each of said porous ceramic members having a structure in which a plurality of cells are placed in parallel with one another in a longitudinal direction with a cell wall therebetween;
an oxide catalyst being supported on at least one portion of said cell wall; and
a catalyst supporting carrier supporting a noble metal catalyst and being placed on the upstream side of said honeycomb structured body,
wherein said oxide catalyst comprises CeO₂ and ZrO₂, and the amount of supported oxide catalyst is set to at least about 10 g/L and at most about 50 g/L with respect to the apparent volume of said honeycomb structured body,
wherein said porous ceramic members are each made of a material that includes inorganic particles that is extrusion-molded to form a raw molded body of a rectangular pillar shape and fired at at least 1400° C. and at most 2300° C. to form a fired body, and
wherein said porous ceramic member has an apparent density of about 0.7 g/cm³ or less and a porosity of at least about 40% and at most about 60%.

12. The exhaust gas purifying device according to claim 11, wherein a heat resistant temperature of said honeycomb structured body is about 1200° C. or more.

13. The exhaust gas purifying device according to claim 11, wherein said honeycomb structured body is mainly made from silicon carbide.

14. The exhaust gas purifying device according to claim 13, wherein the apparent density of said honeycomb structured body is at least about 0.55 g/cm³ and at most about 0.7 g/cm³.

15. The exhaust gas purifying device according to claim 13, wherein the apparent density of said honeycomb structured body is at least about 0.4 g/cm³ and at most about 0.7 g/cm³.

16. The exhaust gas purifying device according to claim 13, wherein the distance between the adjacent cells of said honeycomb structured body is at least about 0.15 mm and at most about 0.5 mm.

17. The exhaust gas purifying device according to claim 13, wherein the aperture ratio of said honeycomb structured body is at least about 50% and at most about 80%.

18. The exhaust gas purifying device according to claim 11, wherein said honeycomb structured body comprises said plurality of porous ceramic members, wherein said porous ceramic members are bound to one another by said sealing material layer formed on outer peripheral walls of said porous ceramic members, and wherein said outer peripheral walls extend in the longitudinal direction.

19. The exhaust gas purifying device according to claim 11, wherein said porous ceramic member comprises at least one member selected from the group consisting of aluminum nitride, silicon nitride, boron nitride, silicon carbide, zirconium carbide, alumina, silica, and aluminum titanate.

20. The exhaust gas purifying device according to claim 11, wherein said porous ceramic member comprises silicon carbide, or silicon and silicon carbide.

21. A honeycomb structured body comprising:
a single porous ceramic member having a structure in which a plurality of cells are placed in parallel with one another in the longitudinal direction with a cell wall therebetween, said porous ceramic member having an integral form as a whole; and
an oxide catalyst that is supported on at least one portion of said cell wall,
wherein said oxide catalyst comprises CeO₂ and ZrO₂, and the amount of supported oxide catalyst is set to at least about 10 g/L and at most about 50 g/L with respect to the apparent volume of said honeycomb structured body,
wherein said porous ceramic member is made of a material that includes inorganic particles that is extrusion-molded to form a raw molded body of a cylindrical shape and fired at at least 1400° C. and at most 2300° C. to form a fired body, and
wherein said porous ceramic member has an apparent density of about 0.7 g/cm³ or less and a porosity of at least about 40% and at most about 60%.

22. The honeycomb structured body according to claim 21, wherein a heat resistant temperature is about 1200° C. or more.

23. The honeycomb structured body according to claim 21, wherein said honeycomb structured body is mainly made from silicon carbide.

24. The honeycomb structured body according to claim 23, wherein the apparent density of said honeycomb structured body is at least about 0.55 g/cm³ and at most about 0.7 g/cm³.

25. The honeycomb structured body according to claim 21, wherein the apparent density of said honeycomb structured body is at least about 0.4 g/cm³ and at most about 0.7 g/cm³.

26. The honeycomb structured body according to claim 21, wherein the distance between the adjacent cells of said honeycomb structured body is at least about 0.15 mm and at most about 0.5 mm.

27. The honeycomb structured body according to claim 21, wherein the aperture ratio of said honeycomb structured body is at least about 50% and at most about 80%.

28. The honeycomb structured body according to claim 21, wherein said porous ceramic member comprises at least one member selected from the group consisting of aluminum nitride, silicon nitride, boron nitride, silicon carbide, zirconium carbide, alumina, silica, and aluminum titanate.

29. The honeycomb structured body according to claim 21, wherein said porous ceramic member comprises at least one member selected from the group consisting of alumina, silica, cordierite, and aluminum titanate.

30. The honeycomb structured body according to claim 21, wherein said honeycomb structured body comprises said single porous ceramic member extending from a first end of said honeycomb structured body to a second end of said honeycomb structure body, and wherein said single porous ceramic member is elongated in the longitudinal direction.

31. An exhaust gas purifying device comprising:
a honeycomb structured body, which is configured to be installed in an exhaust gas flow path, said honeycomb structured body comprising:
  a single porous ceramic member having a structure in which a plurality of cells are placed in parallel with one another in the longitudinal direction with a cell wall therebetween, said porous ceramic member having an integral form as a whole;
  an oxide catalyst being supported on at least one portion of said cell wall; and
  a catalyst supporting carrier supporting a noble metal catalyst and being placed on the upstream side of said honeycomb structured body,
wherein said oxide catalyst comprises $CeO_2$ and $ZrO_2$, and the amount of supported oxide catalyst is set to at least about 10 g/L and at most about 50 g/L with respect to the apparent volume of said honeycomb structured body,
wherein said porous ceramic member is made of a material that includes inorganic particles that is extrusion-molded to form a raw molded body of a cylindrical shape and fired at at least 1400° C. and at most 2300° C. to form a fired body, and
wherein said porous ceramic member has an apparent density of about 0.7 g/cm$^3$ or less and a porosity of at least about 40% and at most about 60%.

32. The exhaust gas purifying device according to claim 31, wherein a heat resistant temperature of said honeycomb structured body is about 1200° C. or more.

33. The exhaust gas purifying device according to claim 31, wherein said honeycomb structured body is mainly made from silicon carbide.

34. The exhaust gas purifying device according to claim 33, wherein the apparent density of said honeycomb structured body is at least about 0.55 g/cm$^3$ and at most about 0.7 g/cm$^3$.

35. The exhaust gas purifying device according to claim 31, wherein the apparent density of said honeycomb structured body is at least about 0.4 g/cm$^3$ and at most about 0.7 g/cm$^3$.

36. The exhaust gas purifying device according to claim 31, wherein the distance between the adjacent cells of said honeycomb structured body is at least about 0.15 mm and at most about 0.5 mm.

37. The exhaust gas purifying device according to claim 31, wherein the aperture ratio of said honeycomb structured body is at least about 50% and at most about 80%.

38. The exhaust gas purifying device according to claim 31, wherein said porous ceramic member comprises at least one member selected from the group consisting of aluminum nitride, silicon nitride, boron nitride, silicon carbide, zirconium carbide, alumina, silica, and aluminum titanate.

39. The exhaust gas purifying device according to claim 31, wherein said porous ceramic member comprises at least one member selected from the group consisting of alumina, silica, cordierite, and aluminum titanate.

40. The exhaust gas purifying device according to claim 31, wherein said honeycomb structured body comprises said single porous ceramic member extending from a first end of said honeycomb structured body to a second end of said honeycomb structure body, and wherein said single porous ceramic member is elongated in the longitudinal direction.

* * * * *